US010742439B2

(12) United States Patent
Sugioka

(10) Patent No.: US 10,742,439 B2
(45) Date of Patent: Aug. 11, 2020

(54) COMMUNICATION ADAPTER

(71) Applicant: NORITZ CORPORATION, Hyogo (JP)

(72) Inventor: Masayuki Sugioka, Akashi (JP)

(73) Assignee: NORITZ CORPORATION, Hyogo (JP)

(*) Notice: Subject to any disclaimer, the term of this patent is extended or adjusted under 35 U.S.C. 154(b) by 0 days.

(21) Appl. No.: 16/495,406

(22) PCT Filed: Apr. 20, 2018

(86) PCT No.: PCT/JP2018/016270
§ 371 (c)(1),
(2) Date: Sep. 19, 2019

(87) PCT Pub. No.: WO2018/198958
PCT Pub. Date: Nov. 1, 2018

(65) Prior Publication Data
US 2020/0021457 A1 Jan. 16, 2020

(30) Foreign Application Priority Data

Apr. 27, 2017 (JP) ................. 2017-088230

(51) Int. Cl.
H04M 11/00 (2006.01)
H04L 12/28 (2006.01)
(Continued)

(52) U.S. Cl.
CPC ............ H04L 12/2818 (2013.01); F24D 3/08 (2013.01); F24H 1/10 (2013.01); H04L 12/2823 (2013.01);
(Continued)

(58) Field of Classification Search
CPC .... H04L 12/28; H04L 12/2816; H04M 11/00; H04M 1/72533; G08C 2201/93; H04W 12/06; F24D 3/08; F24H 1/10
(Continued)

(56) References Cited

U.S. PATENT DOCUMENTS

2002/0180581 A1 12/2002 Kamiwada et al.
2003/0210126 A1* 11/2003 Kanazawa ......... G07C 9/00142
340/5.5
(Continued)

FOREIGN PATENT DOCUMENTS

JP 2002-354557 A 12/2002
JP 2006-319654 A 11/2006
(Continued)

OTHER PUBLICATIONS

International Preliminary Report on Patentability issued in PCT/JP2018/016270; dated Jul. 17, 2018.

Primary Examiner — Melur Ramakrishnaiah
(74) Attorney, Agent, or Firm — Studebaker & Brackett PC

(57) ABSTRACT

When a smartphone, which is an operation terminal connectable to the Internet, receives input for change in hot-water set temperature of a hot water supply device having a hot-water supply function, and the hot-water set temperature after the change instructed by the input for change is within a predetermined high-temperature region, then a request for input of a password is generated for the smartphone. When a password input to the smartphone matches with a predetermined registered password, an instruction for change in hot-water set temperature generated in accordance with the input for change is input to the hot water supply device via a communication adapter.

13 Claims, 16 Drawing Sheets

(51) Int. Cl.
    *H04W 12/06*      (2009.01)
    *F24D 3/08*       (2006.01)
    *F24H 1/10*       (2006.01)

(52) U.S. Cl.
    CPC ..... *H04M 11/007* (2013.01); *H04W 12/0608* (2019.01)

(58) Field of Classification Search
    USPC .......................... 379/102.01, 102.02, 102.05
    See application file for complete search history.

(56) References Cited

U.S. PATENT DOCUMENTS

| | | | | |
|---|---|---|---|---|
| 2009/0103697 A1* | 4/2009 | Matsuoka | ........... | F24D 19/1051 379/102.01 |
| 2014/0084073 A1* | 3/2014 | Cool | .................. | F24D 19/1009 237/8 A |
| 2015/0180880 A1* | 6/2015 | Nakano | ................. | G08C 17/02 726/4 |
| 2015/0294558 A1* | 10/2015 | Huang | ................... | G08C 17/02 340/5.61 |

FOREIGN PATENT DOCUMENTS

| | | |
|---|---|---|
| JP | 2013-138397 A | 7/2013 |
| JP | 2014-049776 A | 3/2014 |
| JP | 2017-058026 A | 3/2017 |

\* cited by examiner

COMMUNICATION ADAPTER

TECHNICAL FIELD

The present invention relates to a communication adapter, a system and method for remote operation of a hot water supply device, and a program, particularly to remote operation of a hot water supply device using communication connection via a communication network.

BACKGROUND ART

Japanese Patent Laying-Open No. 2014-49776 (PTL 1) describes a system for remote control of home appliances by using a mobile phone as a remote control device. In particular, PTL 1 describes that, in remote control of an air conditioner, changes in cooling and heating reference temperatures or the like are permitted in accordance with the result of verification with a preset password.

CITATION LIST

Patent Literature

PTL 1: Japanese Patent Laying-Open No. 2014-49776

SUMMARY OF INVENTION

Technical Problem

Such remote operation via a communication network using a mobile phone or the like may also be applied to a hot water supply device, such as a water heater and a hot water heating system. This enables a user to change, for example, the operation ON/OFF and the set temperature while the user is away from home, thus enhancing user convenience.

However, the user may perform such remote operation without directly knowing the current usage status of a hot water supply device. Thus, too easy user operation for remote operation might cause an operational error or inadvertent operation (e.g., incorrect touching), thus reducing the comfort of an in-home user, if any, who is using the hot water supply device.

Accordingly, in remote control of a hot water supply device, it is preferred that the requirements for password verification be determined from a viewpoint different from that of the remote control of an air conditioner described in PTL 1, by adapting to the mode of use of the hot water supply device.

The present invention has been made to solve such a problem. An object of the present invention is to prevent reduction in comfort of an in-home user who is using a hot water supply device having a hot-water supply function, in remote control of the hot water supply device using communication connection via a communication network.

Solution to Problem

In an aspect of the present invention, a communication adapter is for use in a system for remote operation of a hot water supply device using communication connection via a communication network. The hot water supply device has a hot-water supply function. The system for remote operation includes a receiving processing unit, a password request processing unit, a first temperature instruction control unit, and a second temperature instruction control unit. The receiving processing unit receives input for change in hot-water set temperature of the hot water supply device to an operation terminal connectable to the communication network. The password request processing unit generates a request for input of a password for the operation terminal when a hot-water set temperature after a change instructed by the input for change is within a predetermined high-temperature region. The first temperature instruction control unit generates an instruction for change in the hot-water set temperature to the hot water supply device when a password input to the operation terminal in response to the request for input matches with a predetermined registered password. The second temperature instruction control unit generates no instruction for change in the hot-water set temperature to the hot water supply device when the input password does not match with the registered password. The communication adapter is connected to the hot water supply device via a communication line, and is connectable to the communication network and the operation terminal. The communication adapter is configured to input the instruction for change generated by the first temperature instruction control unit to the hot water supply device.

In another aspect of the present invention, in a system for remote operation of a hot water supply device using communication connection via a communication network, the hot water supply device has a hot-water supply function. The system for remote operation includes a first receiving processing, unit, a first password request processing unit, a first temperature instruction control unit, and a second temperature instruction control unit. The first receiving processing unit receives input for change in hot-water set temperature of the hot water supply device to an operation terminal connectable to the communication network. The first password request processing unit generates a request for input of a password for the operation terminal when a hot-water set temperature after a change instructed by the input for change is within a predetermined high-temperature region. The first temperature instruction control unit generates an instruction for change in the hot-water set temperature to the hot water supply device when a password input to the operation terminal in response to the request for input matches with a predetermined registered password. The second temperature instruction control unit generates no instruction for change in the hot-water set temperature to the hot water supply device when the input password does not match with the registered password.

In another aspect of the present invention, in a method for remote operation of a hot water supply device using communication connection via a communication network, the hot water supply device has a hot-water supply function. The method for remote operation includes: receiving input for change in hot-water set temperature of the hot water supply device to an operation terminal; generating a request for input of a password for the operation terminal when a hot-water set temperature after a change instructed by the input for change is within a predetermined high-temperature region; generating an instruction for change in the hot-water set temperature to the hot water supply device when a password input to the operation terminal in response to the request for input matches with a predetermined registered password; and generating no instruction for change in the hot-water set temperature to the hot water supply device when the input password does not match with the registered password.

In still another aspect of the present invention, for remote operation of a hot water supply device using communication connection via a communication network, a program causes a computer including a processor to execute: receiving input for change in hot-water set temperature of the hot water supply device having a hot-water supply function to an operation terminal connectable to the communication network; generating a request for input of a password for the operation terminal when a hot-water set temperature after a change instructed by the input for change is within a predetermined high-temperature region; generating an instruction for change in the hot-water set temperature to the hot water supply device when a password input to the operation terminal in response to the request for input matches with a predetermined registered password; and generating no instruction for change in the hot-water set temperature to the hot water supply device when the input password does not match with the registered password.

Advantageous Effects of Invention

The present invention can prevent reduction in comfort of an in-home user who is using a hot water supply device having a hot-water supply function, in remote control of the hot water supply device using communication connection via a communication network.

DESCRIPTION OF EMBODIMENTS

Figure 1:
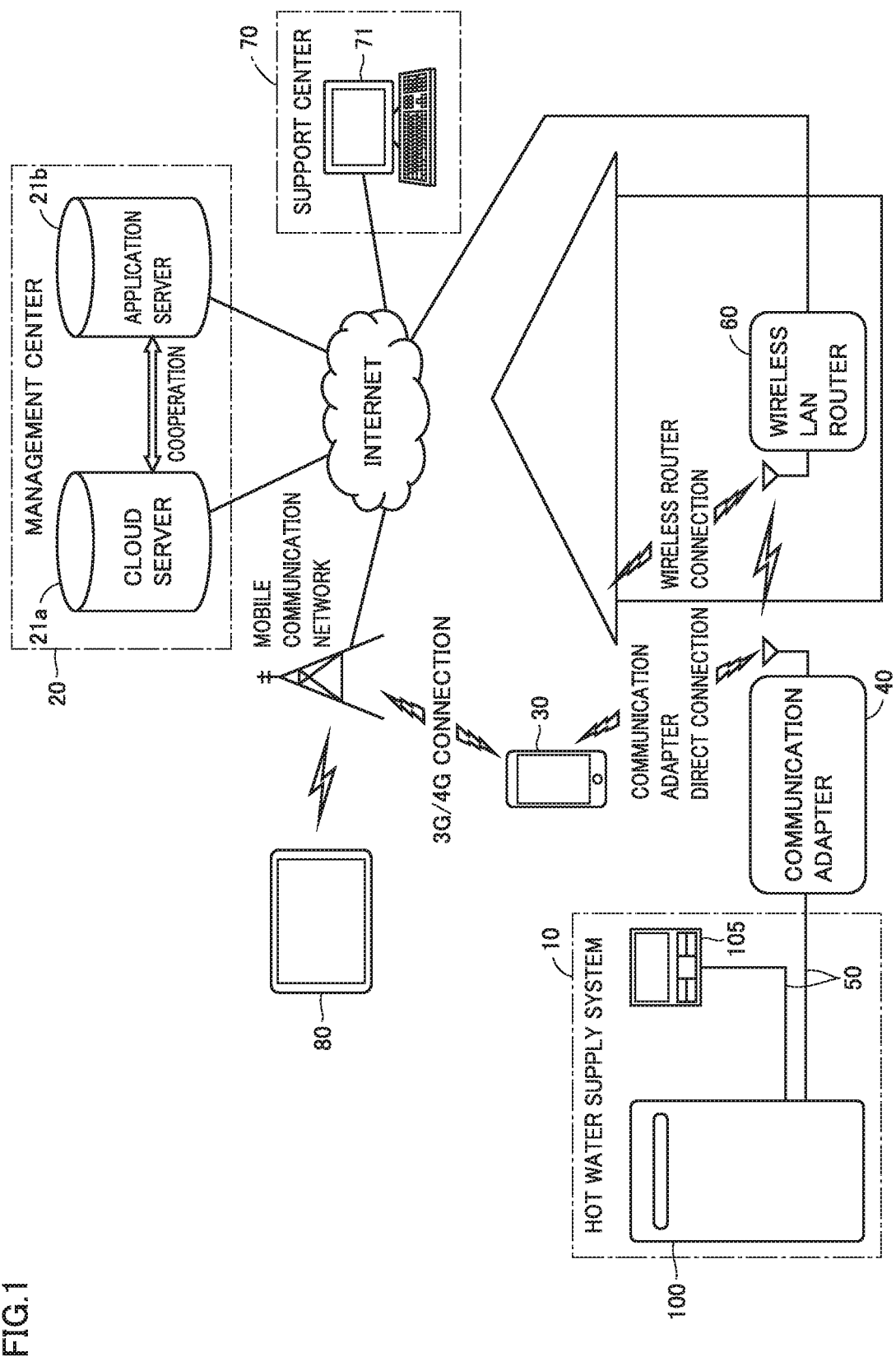
FIG. 1 is a block diagram showing a configuration example of a system for remote operation of a hot water supply device according to the present embodiment.

Embodiments of the present invention are hereinafter described in detail with reference to the drawings. In the following, identical or corresponding parts in the drawings are identically denoted, and the explanation of such parts is not basically repeated.

Embodiment 1

FIG. 1 is a block diagram showing a configuration example of a system for remote control of a hot water supply device according to the present embodiment.

With reference to FIG. 1, a hot water supply system 10 includes a hot water supply device 100 which is an object of remote control, and a remote controller 105 with which to input an operation instruction for hot water supply device 100.

In hot water supply system 10, hot water supply device 100 and remote controller 105 are communicably connected to each other through a duplex communication line 50. Specifically, hot water supply device 100 and remote controller 105 have their respective built-in control units (not shown) including, for example, microcomputers. These control units are configured to perform serial communication with each other through duplex communication line 50, using a prescribed communication protocol. Hot water supply device 100 may be configured to output a power supply voltage for external devices to duplex communication line 50. In this case, communication data can be superimposed on the power supply voltage.

Further, the control unit of hot water supply device 100 is connected to a communication adapter 40 through duplex communication line 50. For example, hot water supply system 10 and communication adapter 40 may be installed outdoors, e.g., around the outer wall of a house or in a garage. In embodiment 1, hot water supply device 100 is a water heater 100a having a hot-water supply function.

Figure 2:
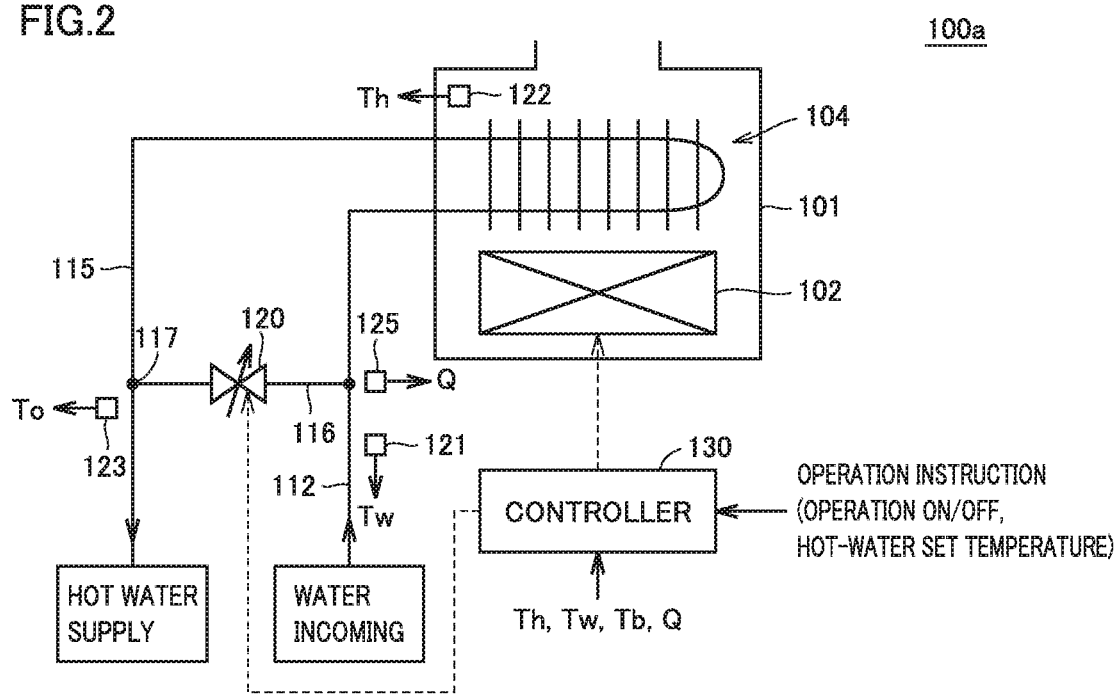
FIG. 2 is a block diagram explaining a configuration example of a water heater as an example of the hot water supply device shown in FIG. 1.

FIG. 2 is a block diagram explaining a configuration example of a water heater as an example of the hot water supply device.

With reference to FIG. 2, water heater 100a includes a combustion can body (hereinafter also simply referred to as a "can body") 101 containing, for example, a combustion burner 102 and a heat exchanger 104; an incoming water pipe 112; an outgoing hot water pipe 115; a bypass pipe 116; a bypass flow regulating valve 120; and a controller 130 comprising a microcomputer. Controller 130 corresponds to the above-described control unit of hot water supply device 100.

When a water tap (not shown) is turned on, low-temperature water flows into incoming water pipe 112 with a supply pressure of, for example, the tap water pressure. Incoming water pipe 112 is connected to the input side of heat exchanger 104. The low-temperature water is heated by the heat generated from combustion burner 102 while passing through heat exchanger 104. For example, combustion burner 102 generates heat by combusting supplied fuel gas with a burner (not shown). The quantity of heat generation from combustion burner 102 can be controlled by controller 130 controlling the number of burners to ignite and the flow rate of fuel gas. The high-temperature water obtained by heating in heat exchanger 104 is output to outgoing hot water pipe 115.

From incoming water pipe 112, bypass pipe 116 having bypass flow regulating valve 120 branches. Thus, the low-temperature water supplied to incoming water pipe 112 is distributed to bypass pipe 116 by a distribution ratio according to the degree of opening of bypass flow regulating valve 120. The degree of opening of bypass flow regulating valve 120 is controlled by controller 130.

Outgoing hot water pipe 115 has a junction 117 with bypass pipe 116. The high-temperature water obtained by heating in heat exchanger 104 and the low-temperature water that has passed through bypass pipe 116 are mixed and supplied to, for example, a hot water tap (not shown) through water heater 100a. The mixing ratio between the high-temperature water and the low-temperature water can be controlled depending on the degree of opening of bypass flow regulating valve 120.

A temperature sensor 121 to detect a low-temperature-water temperature Tw is disposed on incoming water pipe 112, and temperature sensor 122 to detect a high-temperature-water temperature Th after heating is disposed downstream of heat exchanger 104. Further, a temperature sensor 123 to detect an outgoing-hot-water temperature To is disposed downstream of junction 117 on outgoing hot water pipe 115, and a flow rate sensor 125 for low-temperature water is disposed on incoming water pipe 112.

Controller 130 receives input of an operation instruction for water heater 100a. For example, the operation instruction includes an operation ON/OFF instruction for switching between the operation ON state and the operation OFF state of water heater 100a, and a hot-water set temperature. Controller 130 controls the degree of opening of bypass flow regulating valve 120, the actuation/stop of combustion burner 102, and the quantity of heat generation from combustion burner 102.

In the operation ON state of water heater 100a, when the hot water tap is turned on, and the flow rate detected by flow rate sensor 125 exceeds a prescribed quantity ("minimum operating quantity of water [MOQ]"), then controller 130 actuates combustion burner 102 to supply hot water through outgoing hot water pipe 115. On the other hand, in the operation OFF state of water heater 100a. combustion burner 102 is maintained in the stopped state (no combustion) regardless of the flow rate detected by flow rate sensor 125.

When combustion burner 102 is actuated (i.e., when hot water is supplied), controller 130 controls the quantity of heat generation from combustion burner 102 so that high-temperature-water temperature Th will be a set temperature for high-temperature water higher than the hot-water set temperature. Further, controller 130 controls the degree of opening of bypass flow regulating valve 120 so that outgoing-hot-water temperature To will be the hot-water set temperature. The whole quantity of low-temperature water may flow through heat exchanger 104, with no bypass pipe 116 and bypass flow regulating valve 120.

Referring back to FIG. 1, communication adapter 40 includes a built-in wireless communication controller (not shown) for performing wireless communication with an indoor wireless local area network (LAN) router 60, using a prescribed communication protocol (e.g., IEEE802.11n). Examples of wireless communication controllers include a commercially-available custom-programmable wireless LAN module.

Wireless LAN router 60 is connected to the Internet network (communication network). Wireless LAN router 60 may serve as a host of wireless LAN which wirelessly connects a plurality of wireless LAN slaves.

Smartphone 30 and communication adapter 40 can operate as wireless LAN slaves and can connect to the Internet via wireless LAN router 60 when a wireless link with wireless LAN router 60 is established. If smartphone 30 cannot connect, to the Internet via wireless LAN router 60, smartphone 30 is configured to connect to the Internet network via a mobile communication network, such as 4G or 3G lines.

Figure 3:
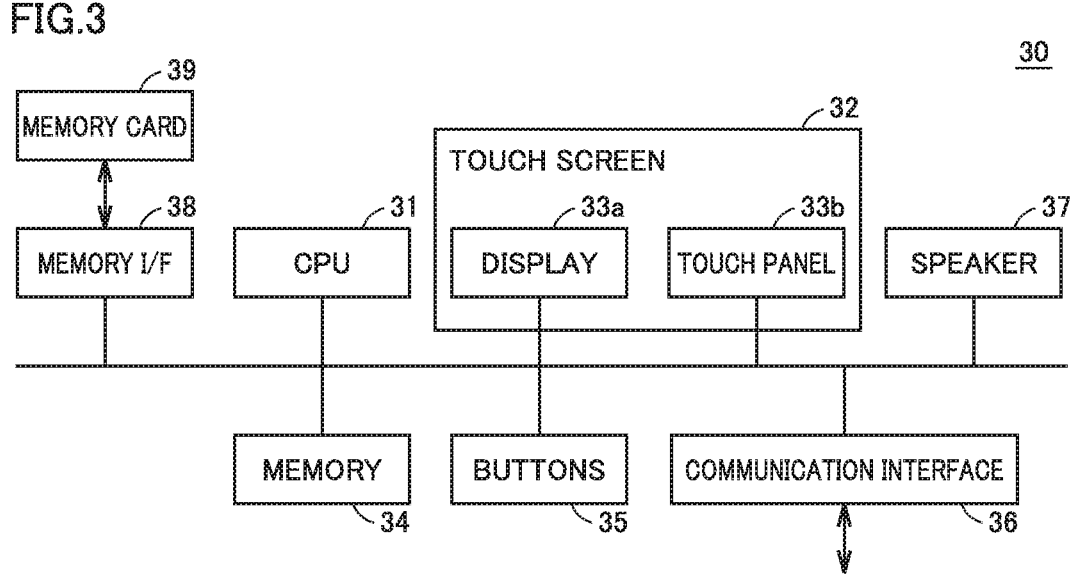
FIG. 3 is a block diagram explaining a schematic configuration of the smartphone shown in FIG. 1.

FIG. 3 is a schematic configuration diagram of smartphone 30 shown in FIG. 1.

With reference to FIG. 3, smartphone 30 includes a central processing unit (CPU) 31, a touch screen 32, a memory 34, buttons (operational unit) 35 including a power on/off button, a communication interface 36, a speaker 37 for voice output, and a memory I/F (abbreviation of Interface) 38. As a function of communicating with a device external to smartphone 30, communication interface 36 has at least a function of communication connection with communication adapter 40, a function of communication connection with wireless LAN router 60, and a function of communication connection with a mobile communication network.

Memory I/F 38 corresponds to a memory driver which reads and writes data from and to a memory card 39 externally and removably mounted. However, the type of storage medium mounted is not limited to a memory card.

Touch screen 32 may be composed of a display 33a and a touch panel (tablet) 33b to serve as an input device integrated with a display. Alternatively, the display and the operational unit (including buttons and keys) may be separately provided.

Memory 34 is implemented by various types of memory, such as a random access memory (RAM), a read only memory (ROM), a flash memory, and a hard disk. Memory 34 stores various programs to be executed by CPU 31. CPU 31 can execute various control processes and the like, by executing various programs stored in memory 34.

Referring back to FIG. 1, in the system for remote control of a hot water supply device according to the present embodiment, a management center 20 and a support center 70 are connected to the Internet network (communication network). Management center 20 includes a cloud server 21a and an application server 21b. Cloud server 21a and application server 21b are communicably connected to each other via the Internet network or a dedicated line, so as to provide various services in cooperation with each other.

Figure 4:
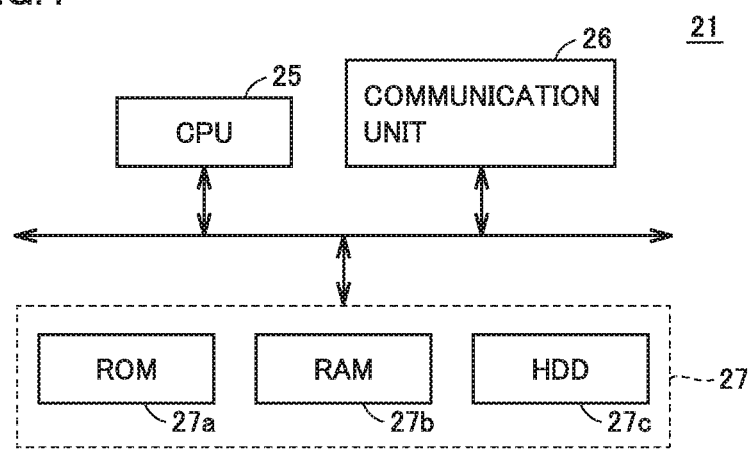
FIG. 4 is a schematic configuration diagram of a server device constituting the cloud server and the application server shown in FIG. 1.

FIG. 4 is a schematic configuration diagram of server device 21 constituting cloud server 21a and application server 21b.

With reference to FIG. 4, server device 21 includes a CPU 25 for controlling the overall device, and a communication unit 26 and a memory 27 connected to CPU 25. Communication unit 26 has a function of communicating with other devices or servers via communication connected to a communication network (Internet).

By way of example, memory 27 includes a ROM 27a, which is a memory for storing programs to be executed by CPU 25; a RAM 27b, which is a memory for serving as a work area for CPU 30 to execute a program and storing calculated values; and a hard disk drive (HDD) 27c as an example of a large storage device.

Server device 21 can be configured with functions corresponding to those of commonly used computers. Server device 21 may further include at least one of an operational unit and a display for receiving input of operations.

Referring back to FIG. 1, cloud server 21a is always connected to multiple communication adapters 40 installed in respective homes, and mainly communicates with these communication adapters 40 to collect and manage various types of information on hot water supply systems 10 in respective homes. For example, the information to be collected may include the quantity of hot water supply per unit time, the quantity of fuel consumption, the hot-water set temperature, and information on errors occurring in hot water supply systems 10.

Application server 21b manages multiple user accounts for multiple users in homes, and receives login from operation terminals, such as the users' smartphones 30. Thus, application server 21b provides various services to the users' operation terminals.

Preferably, dedicated application software is installed in smartphone 30 for accessing a service provided by application server 21b. Through such application software, a login operation and various operations after the login can be performed. Alternatively, a web-based service may be provided so that login and other operations can be performed through an appropriate web browser.

Application server 21b may provide only application services to user terminals (e.g., smartphones 30), while another customer information management server manages customer information including user accounts. Alternatively, cloud server 21a and application server 21b may be formed as an integrated server device.

A control unit (not shown) of communication adapter 40 can collect various types of information on hot water supply system 10 stored and held by the control units of hot water supply device 100 and remote controller 105, through communication with hot water supply system 10. Also, the control unit of communication adapter 40 can send the collected information to management center 20 (in particular, cloud server 21a), through communication via a communication network (Internet). Further, communication adapter 40 receives an operation instruction for hot water supply system 10 from management center 20 or user's smartphone 30, and sends the operation instruction to hot water supply system 10. Thus, remote operation of hot water supply device 100 can be implemented.

The remote operation according to the present embodiment is a service for remote operation of hot water supply device 100. The remote operation is performed through communication connection via a communication network (Internet), using an "operation terminal", such as a user's smartphone 30, a tablet terminal 80 for a site worker, a terminal 71 at support center 70, or a personal computer (not shown). Specifically, hot water supply device 100 can be operated in accordance with operation, input to the operation terminal, for a change related to the operation of hot water supply system 10, such as operation for switching ON/OFF the above-described hot water supply operation, and operation for changing the hot-water set temperature.

For example, the remote operation by the user can be provided as one of the above-described dedicated application software. For example, the remote operation becomes ready in response to a login to application server 21b through, for example, smartphone 30. Specifically, when a user logs in to application server 21b, the user can input an operation instruction (an operation ON/OFF instruction or a hot-water set temperature instruction) to controller 130 via communication adapter 40 associated with the user account, not only from remote controller 105, but also from outside of hot water supply system 10 via communication adapter 40.

Figure 5:
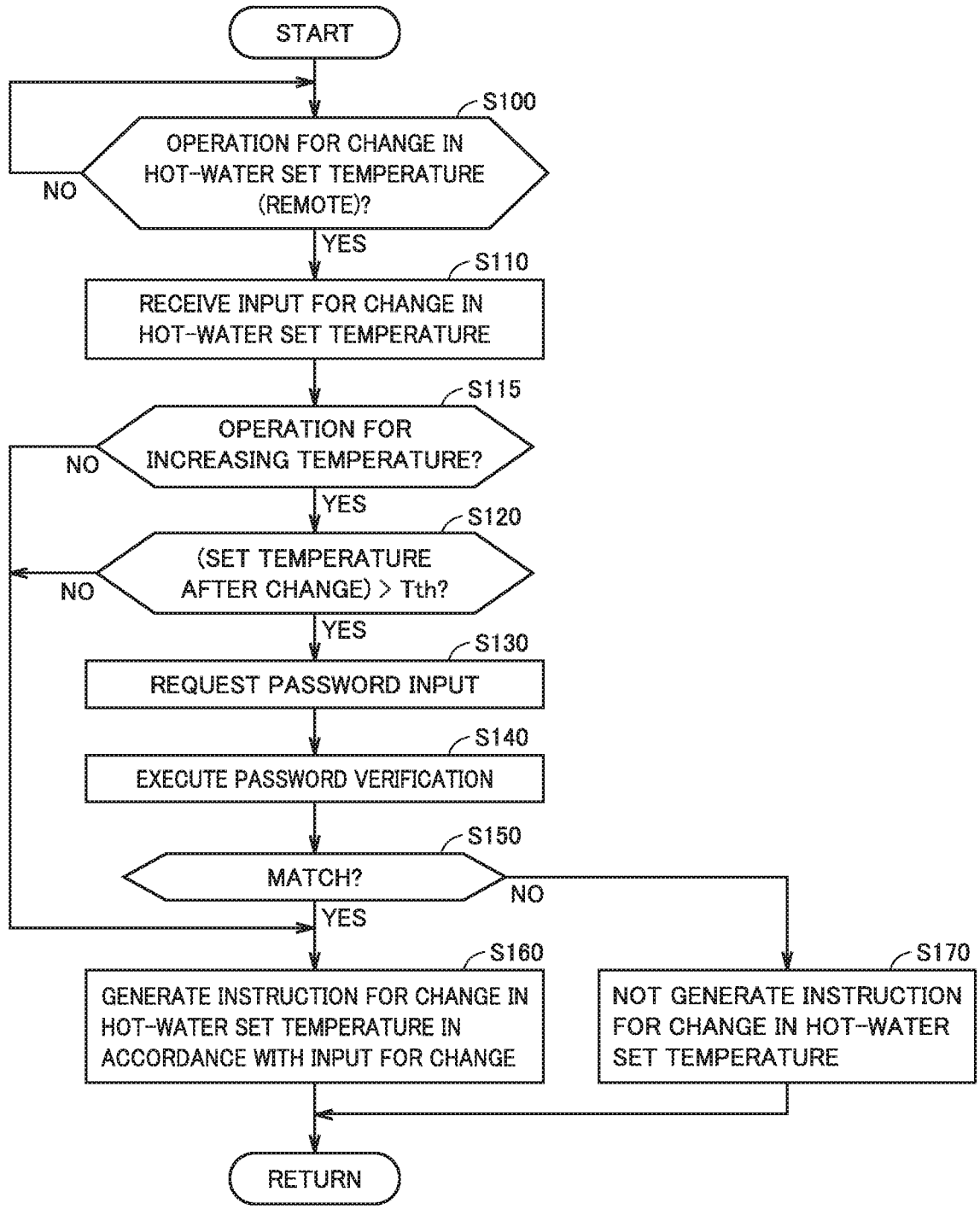
FIG. 5 is a flowchart explaining a control process related to a change in hot-water set temperature in remote operation of a hot water supply device according to embodiment 1.
Figure 8:
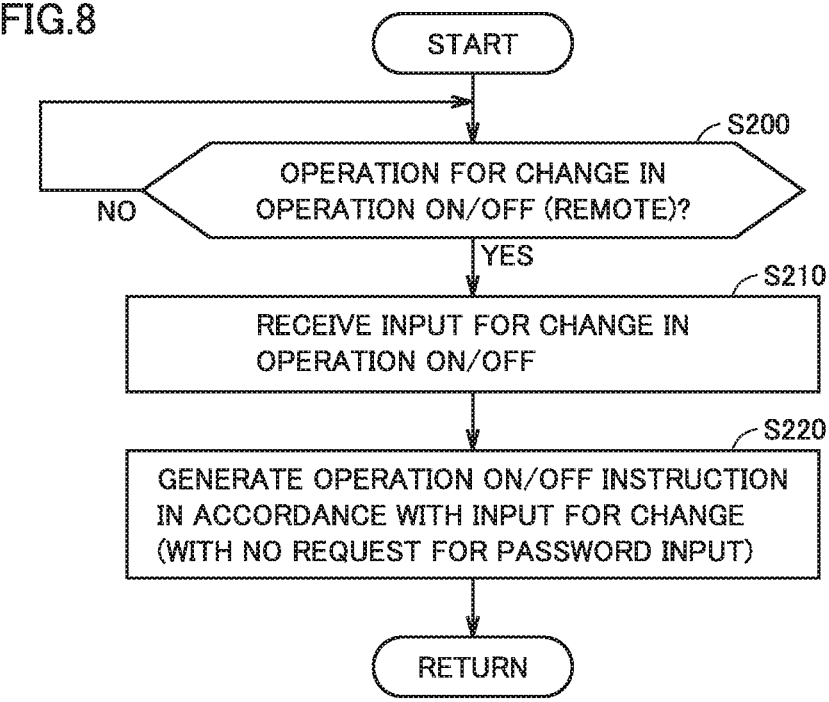
FIG. 8 is a flowchart explaining a control process related to a change in operation ON/OFF in remote operation of a hot water supply device according to embodiment 1.

FIG. 5 is a flowchart explaining a control process related to a change in hot-water set temperature in remote operation of a hot water supply device according to embodiment 1. FIG. 5 shows a control process related to input for change in hot-water set temperature. A control process related to input for change in operation ON/OFF of water heater 100a is shown in FIG. 8, which will be described later.

The flowcharts including FIG. 5 describe a case in which smartphone 30 is used as an "operation terminal" for remote operation. Accordingly, the control processes shown in the flowcharts including FIG. 5 can be executed by CPU 31 of smartphone 30.

In the present embodiment, the control processes for remote operation shown in the flowcharts including FIG. 5 are started up when a predetermined input screen for remote operation appears after dedicated application software for remote operation is started up and logged in.

Figure 6:
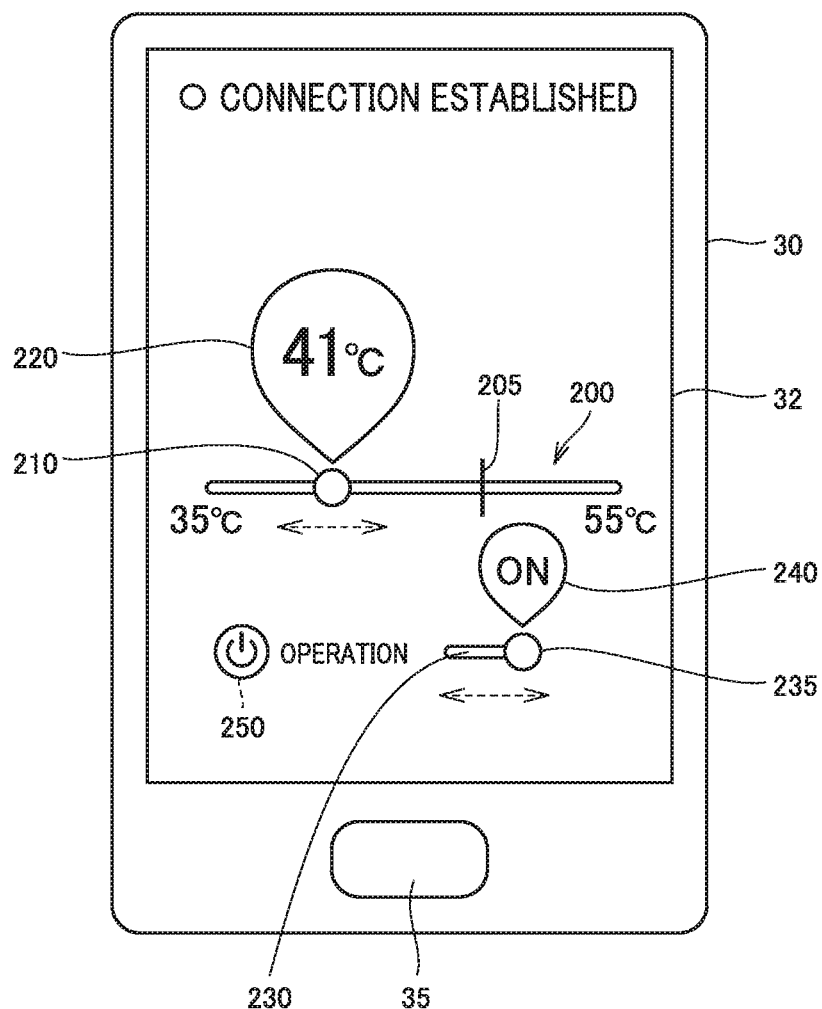
FIG. 6 is a conceptual diagram showing an example of an input screen for remote operation.

FIG. 6 shows an example of an input screen for remote operation.

With reference to FIG. 6, an input screen for remote operation appears on touch screen 32 of smartphone 30. The input screen shows an indicator bar 200, an operation pointer 210, and an indicator icon 220, which, are related to the hot-water set temperature; and an indicator bar 230, an operation pointer 235, and an indicator icon 240, which are related to the operation ON/OFF instruction.

Indicator bar 200 indicates the settable range of the hot-water set, temperature (35 to 55° C. in the example of FIG. 6). Operation pointer 210 moves on indicator bar 200 when touched and slid by a user. CPU 31 can calculate the hot-water set temperature in accordance with the position of operation pointer 210 on indicator bar 200. Indicator icon 220 shows the numerical data of the calculated hot-water set temperature.

When CPU 31 senses user operation on operation pointer 210, CPU 31 receives input for change in hot-water set temperature into the temperature according to the position of the operated operation pointer 210. On indicator bar 200, a boundary 205 of a high-temperature region (described later) may be further displayed. In the example of FIG. 6, when operation pointer 210 is located on the right of boundary 205, the hot-water set temperature is in the high-temperature region.

Indicator bar 230 indicates the operation ON state and the operation OFF state of water, heater 100a in a binary manner. Operation pointer 235 moves to right and left on indicator bar 230 in response to sliding operation when touched by the user. Operation pointer 235 is displayed on the leftmost or rightmost position on indicator bar 230. Indicator icon 240 indicates textual information representing whether water heater 100a, is in the operation ON state or the operation OFF state, in accordance with the position of operation pointer 235.

Alternatively, switching operation between the operation ON/OFF can be recognized each time the user touches softswitch 250 for the operation ON/OFF operation. In this case, each time softswitch 250 is operated, the position of operation pointer 235 and the content of indicator icon 240 may be changed on the input screen.

Thus, CPU 31 receives input for change in operation ON/OFF of water heater 100a in response to the user's touch on operation pointer 235 or softswitch 250.

Referring back to FIG. 5, by step S100, CPU 31 determines whether or not operation for change in hot-water set temperature of water heater 100a (i.e., remote operation) has been input on an input screen for remote operation. As described above, when the user's touch on operation pointer 210 related to the hot-water set temperature is sensed, then step S100 is determined to be YES, and the processes at and after step S110 are started up. On the other hand, when the user's touch is not sensed, the start-up of the processes at and after step S110 is waited.

When CPU 31 senses a touch on operation pointer 210 (YES at S100), CPU 31 receives, by step S110, input for change in hot-water set temperature into the temperature calculated, from the position of the operated operation pointer 210.

By step S115, CPU 31 determines whether or not the input for change in hot-water set temperature is for increasing the hot-water set temperature. CPU 31 can execute the determination at step S115 by, for example, comparing the current hot-water set temperature (before the input for change) with the hot-water set temperature after the input for change.

When the input for change received at step S110 is for increasing the hot-water set temperature (YES at S115), CPU 31 determines, by step S120, whether the hot-water set temperature after the change is higher than a predetermined determination temperature Tth for defining the high-temperature region. Tth may be set to 50° C., for example. Boundary 205 in FIG. 6 is displayed on the position corresponding to determination temperature Tth on indicator bar 200.

When the hot-water set temperature after the change is higher than determination temperature Tth (YES at S120), CPU 31 requests password input from the user by step S130. This causes a screen prompting password input to appear on touch screen 32 of smartphone 30.

Figure 7:
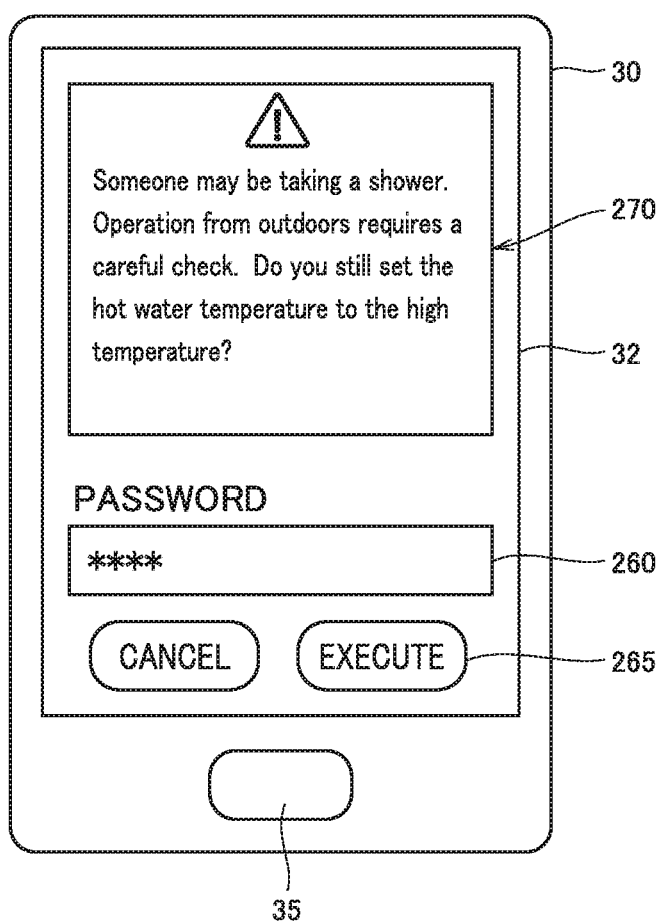
FIG. 7 is a conceptual diagram showing an example of a screen prompting password input.

FIG. 7 is a conceptual diagram showing an example of a screen prompting password input.

With reference to FIG. 7, the screen prompting password input includes a password input section 260, and an execution button 265 for a verification process. For example, the user can input a password in password input section 260 by touching numeric keys or alphabetic keys on a software keyboard appearing on a part of touch screen 32. FIG. 7 exemplarily shows a state where a password has been input via a software keyboard but the software keyboard has been disappeared from the display.

In response to the user's touch on execution button 265, a password verification process for the password input to password input section 260 is executed. Preferably, the screen prompting password input further shows a warning message 270 to the user.

Warning message 270 indicates textual information for notifying a possible influence on an in-home user which may be caused when water heater 100a is remotely operated in accordance with input for change from the user. Warning message 270 exemplarily shown in FIG. 7 notifies the influence on an in-home user which may be caused by setting the hot-water set temperature to the high-temperature region.

Referring back to FIG. 5, in response to a touch on execution button 265 on the password input screen shown in FIG. 7, CPU 31 executes a password verification process by step S140.

For example, the user may register in advance a password for remote operation of water heater 100a, as one of the processes performed by dedicated application software. The password registered in advance (hereinafter also referred to as a "registered password") may be stored in application server 21b or another management server.

At step S140, the password input to password input section 260 in FIG. 7 (hereinafter also referred to as an "input password") is verified against the registered password. If the input password is sent from smartphone 30 to application server 21b, the verification process can be executed on the server side. In this case, the verification result, that is, the data representing whether the password is verified to be authentic, is sent from application server 21b to smartphone 30. Conversely, if the registered password is sent from application server 21b to smartphone 30, the verification process can be executed on the operation terminal (smartphone 30) side. Thus, in at least the password verification process, communication connection via a communication network (Internet) is used, between an operation terminal (e.g., smartphone 30) and a device where the registered password is stored (server).

When the input password matches with the registered password by step S150 (YES at S150), CPU 31 advances the process to step S160 and generates an instruction for change in hot-water set temperature in accordance with the input for change received at step S110.

The instruction for change in hot-water set temperature generated at step S160 is input to controller 130 (FIG. 2) of water heater 100a via communication adapter 40. Thus, controller 130 changes the hot-water set temperature of water heater 100a.

On the other hand, when the input password does not match with the registered password (NO at S150), CPU 31 advances the process to step S170, where no instruction for change in hot-water set temperature is generated. As a result, an instruction for change in hot-water set temperature is not input to the controller 130 of water heater 100a, and thus the hot-water set temperature of water heater 100a is maintained.

When step S170 is executed, touch screen 32 of smartphone 30 preferably shows a message notifying that the hot-water set temperature value has not been changed because the password does not match.

Further, when the input for change in hot-water set temperature is not for increasing the temperature, that is, when the hot-water set temperature after the change is equal to or less than the current hot-water set temperature, then CPU 31 determines step S115 to be NO and advances the process to step S160. When CPU 31 receives input for change for increasing the hot-water set temperature, but the hot-water set temperature after the change is equal to or less than determination temperature Tth, then CPU 31 determines step S120 to be NO and also advances the process to step S160. In these cases, an instruction for change in hot-water set temperature of water heater 100a is generated by remote operation that does not require password input.

Thus, according to embodiment 1, in remote operation directed to water heater 100a having a hot-water supply function, when the hot-water set temperature is to be increased to the high-temperature region, the hot-water set temperature cannot be changed by one-touch operation. Rather, password input is requested from the user before the hot-water set temperature is actually changed. This can prevent an increase in hot-water set temperature to the high-temperature region due to an operational error or inadvertent operation (e.g., incorrect touching) in remote operation while an in-home user is using water heater 100a, Thus, reduction in comfort of the user can be prevented.

On the other hand, as to remote operation for decreasing the hot-water set temperature, the hot-water set temperature can be changed without requesting password input. This enhances user convenience when the user wants to decrease the hot-water set temperature quickly.

Also, as to remote operation where the hot-water set temperature after the change is outside of the high-temperature region, the hot-water set temperature can be changed without requesting password input. This can prevent reduction in user convenience due to excessive request for password input.

Further, remote operation for the operation ON/OFF of water heater 100a can also be performed without requiring password input.

FIG. 8 shows a flowchart explaining a control process related to input for change in operation ON/OFF of water heater 100a.

With reference to FIG. 8, by step S200, CPU 31 determines whether or not operation for change in operation ON/OFF of water heater 100a (i.e., remote operation) has been input to the input screen for remote operation. For example, when the input screen in FIG. 6 senses the user's touch on operation pointer 235 or softswitch 250 related to the operation ON/OFF instruction, then step S200 is determined to be YES, and the processes at and after step S210 are started up. On the other hand, when the user's touch is not sensed, the start-up of the processes at and after step S210 is waited.

When CPU 31 senses a touch on operation pointer 235 or softswitch 250 (YES at S200), CPU 31 receives input for change in operation ON/OFF by step S210 and advances the process to step S220.

At step S220, CPU 31 generates an operation ON/OFF instruction for water heater 100a in accordance with the received input for change, without requesting password input from the user. The generated operation ON/OFF instruction is input to controller 130 (FIG. 2) of water heater 100a via communication adapter 40. This causes water heater 100a in the operation OFF state to switch to the operation ON state, or causes water heater 100a in the operation ON state to switch to the operation OFF state.

If water heater 100a having only a hot-water supply function is an object of remote operation, the request for password input can be omitted for giving priority to user convenience. Thus, in the system for remote operation of a hot water supply device according to embodiment 1, water heater 100a corresponds to an example of a hot water supply device having a hot-water supply function.

The control process shown in FIG. 5 can omit the process by step S115. That is, whether to request password input may be switched only in accordance with the determination by step S120, i.e., the determination of whether the hot-water set temperature after the change is within the high-temperature region. Such control can also implement the remote operation according to embodiment 1.

In the system for remote operation of a hot water supply device according to embodiment 1, the process of step S110 implements the function of the "(first) receiving processing unit", and the processes of step S120 (when determined to be YES) and S130 implement the function of the "(first) password request processing unit". The processes of step S150 (when determined to be YES) and S160 implement the function of the "first temperature instruction control unit", and the processes of step S150 (when determined to be NO) and S170 implement the function of the "second temperature instruction control unit". The processes of step S115 (when determined to be NO) and S160 implement the function of the "third temperature instruction control unit".

Embodiment 2

Embodiment 2 describes remote operation in the case in which a hot water supply device as an object of remote operation is a space-heating water heater having both a hot-water supply function and a space-heating function.

Figure 9:
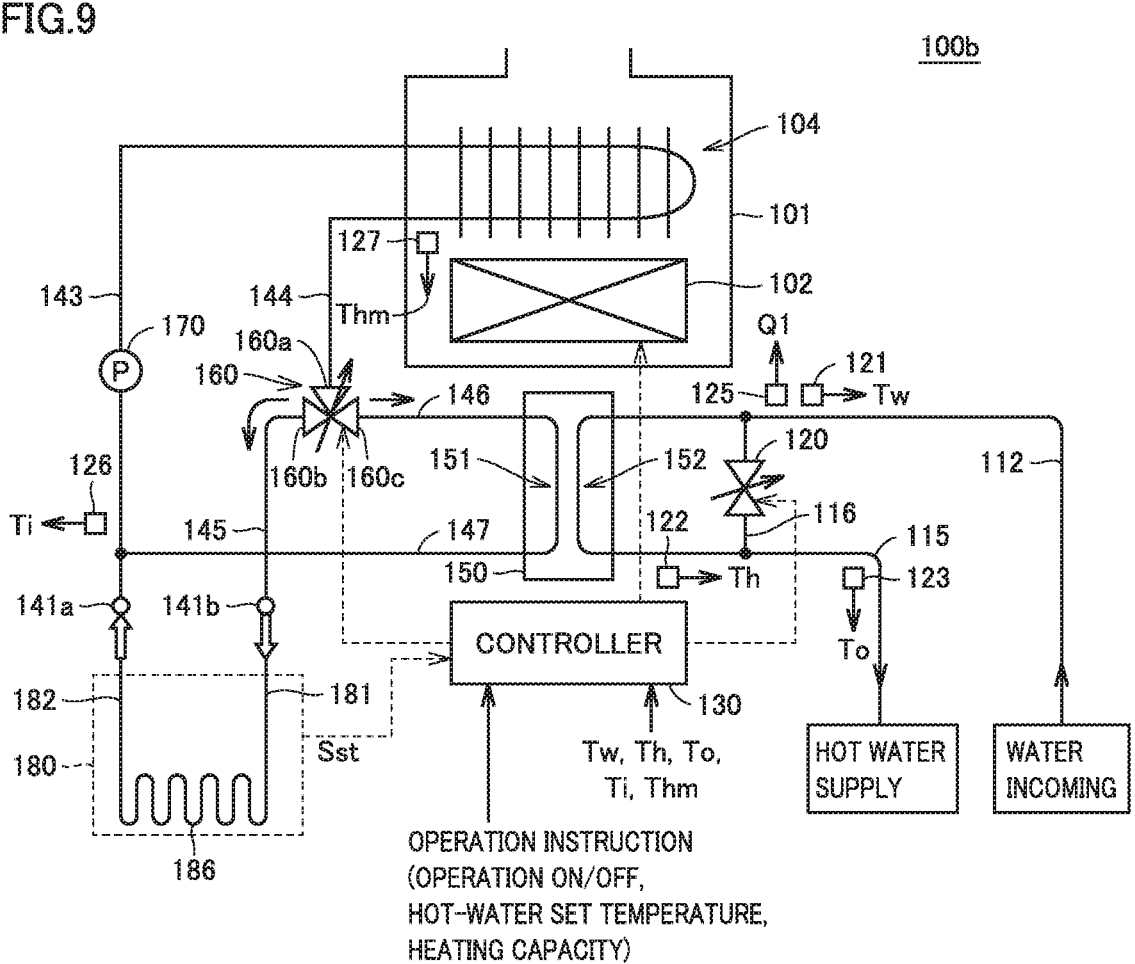
FIG. 9 is a block diagram explaining, a configuration example of a space-heating water heater, which is an object of operation in a system for remote operation of a hot water supply device according to embodiment 2.

FIG. 9 is a block diagram explaining a configuration of a space-heating water heater 100b, which is an object of operation in a system for remote operation of a hot water supply device according to embodiment 2. In the system for remote control according to embodiment 2, space-heating water heater 100b is connected in hot water supply system 10, instead of water heater 100a in the configuration in FIG. 1. The system configuration of the other parts shown in FIG. 1 is the same in embodiment 2.

When FIG. 9 is compared with FIG. 2, space-heating water heater 100b is different from water heater 100a in that space-heating water heater 100b has a function of supplying a heating medium (high-temperature water) to a space heater 180. Space-heating water heater 100b implements a function of hot-water supply through outgoing hot water pipe 115 by heating low-temperature water introduced into incoming water pipe 112 by heat exchange with the heating medium.

With reference to FIG. 9, space-heating water heater 100b includes an input end 141a and, output end 141b of heating medium connected to space heater 180, pipes 143 to 147, a hot-water-supply heat exchanger 150, a distributing valve 160, and a circulation pump 170. Hot-water-supply heat exchanger 150 has a heat transfer mechanism between a primary-side path 151 and a secondary-side path 152.

Space heater 180 includes a radiator 186. Space heater 180 is connected between input end 141a and output end 141b via external pipes 181 and 182. Space heater 180 further includes a control unit (not shown). The control unit outputs a heating operation signal Sst, which is a binary signal, to controller 130 of space-heating water heater 100b. For example, when space heater 180 starts operating in response to user operation, heating operation signal Sst changes from "0" to "1". On the other hand, when space heater 180 in operation stops in response to user operation, heating operation signal Sst changes from "1" to "0".

Pipe 143 connects input end 141a to the input side of heat exchanger 104. Pipe 144 connects the output side of heat exchanger 104 to a first node 160a of distributing valve 160. Pipe 145 connects a second node 160b of distributing valve 160 to output end 141b.

Pipe 146 connects a third node 160c of distributing valve 160 to the input side of primary-side path 151 of hot-water-supply heat exchanger 150. Pipe 147 connects the output side of primary-side path 151 of hot-water-supply heat exchanger 150 to pipe 143.

Depending on the degree of opening of distributing valve 160, the ratio between the flow rate in the path of first node 160a and second node 160b, and the flow rate in the path of first node 160a and third node 160c is controlled. Circulation pump 170 is located on pipe 143, on the downstream side (on the heat exchanger 104 side) relative to the junction between pipe 143 and pipe 147.

A temperature sensor 126 is provided on pipe 143 to detect input temperature Ti of heating medium. A temperature sensor 127 is provided on the output side of heat exchanger 104 to detect the temperature of heating medium heated by heat exchanger 104.

On the hot water supply side, incoming water pipe 112 is connected to the input side of secondary-side path 152 of hot-water-supply heat exchanger 150. Outgoing hot water pipe 115 is connected to the output side of secondary-side path 152 of hot-water-supply heat exchanger 150. Bypass pipe 116 and bypass flow regulating valve 120 are connected between incoming water pipe 112 and outgoing, hot water pipe 115, as in FIG. 2. Temperature sensors 121, 123 are located similarly to those in FIG. 2 and detect low-temperature-water temperature Tw in incoming water pipe 112 and outgoing-hot-water temperature To in outgoing hot water pipe 115. Temperature sensor 122 is disposed on the output side of secondary-side path 152 and detects high-temperature-water temperature Th after heating with hot-water-supply heat exchanger 150. Flow rate sensor 125 detects the rate of flow introduced in incoming water pipe 112.

Controller 130 receives input of low-temperature-water temperature Tw, high-temperature-water temperature Th, outgoing-hot-water temperature To, and input temperature Ti and output temperature Thm of heating medium detected by temperature sensors 121 to 123, 126, 127. Further, controller 130 receives input of a flow rate Q1 detected by flow rate sensor 125, and heating operation signal Sst from space heater 180.

Controller 130 controls the degree of opening of bypass flow regulating valve 120, the actuation/stop of combustion burner 102, and the quantity of heat generation from combustion burner 102. Also, controller 130 further controls the actuation/stop of circulation pump 170 and the degree of opening of distributing valve 160.

Controller 130 receives input of an operation instruction for space-heating water heater 100b. For example, the operation instruction includes an operation ON/OFF instruction for switching between the operation ON state and the operation OFF state of space-heating water heater 100b, and a hot-water set temperature in the hot water supply operation. Additionally, a heating capacity of the heating operation, which is set in a stepwise manner, is also input. For example, the higher the heating capacity is set, the higher the target value of the output temperature of heating medium is set.

Next, the operation of space-heating water heater 100b is described.

When circulation pump 170 is actuated, and distributing valve 160 forms a path of heating medium between first node 160a and second node 160b, a heating circulation path for circulating the heating medium between space-heating water heater 100b and space heater 180 is formed. Inside space-heating water heater 100b, the heating circulation path includes pipe 143, heat exchanger 104, pipe 144, first node 160a and second node 160b of distributing valve 160, and pipe 145, between input end 141a and output end 141b.

On the other hand, when distributing valve 160 forms a path of heating medium between first node 160a and third node 160c, pipes 146 and 147 form a bypass path where the heating medium which bypasses space heater 180 flows through primary-side path 151 of hot-water-supply heat exchanger 150. Accordingly, when circulation pump 170 is actuated, the heating medium heated by heat exchanger 104 can flow through the bypass path. Depending on the degree of opening of distributing valve 160, the diversion ratio of the flow rate in the bypass path to the flow rate in the heating circulation path can be controlled.

In the operation ON state of space-heating water heater 100b, when heating operation signal Sst is set to "1", controller 130 actuates circulation pump 170 and combustion burner 102, thus heating the heating medium and forming the above-described heating circulation path. The quantity of heat generation from combustion burner 102 is controlled so that output temperature Thm of heating medium will be equal to the output temperature target corresponding to the set heating capacity.

During the heating operation, when the hot water tap (not shown) is turned off, and the flow rate Q1 detected by flow rate sensor 125 is lower than a prescribed minimum flow rate, then the heating operation alone is executed. Thus, distributing, valve 160 is controlled so that the whole quantity of heating medium flows through the heating circulation path.

On the other hand, during the heating operation, when the hot water tap (not shown) is turned on, and the flow rate Q1 detected by flow rate sensor 125 exceeds the minimum flow rate, then a simultaneous operation of both heating and hot water supply is executed. In the simultaneous operation, while circulation pump 170 and combustion burner 102 are being actuated, distributing valve 160 is controlled so that the heated heating medium partially flows through the bypass path. Thus, in hot-water-supply heat exchanger 150, the low-temperature water introduced from incoming, water pipe 112 into secondary-side path 152 is heated by the heating medium flowing through primary-side path 151. As a result, hot water can be supplied from outgoing hot water pipe 115 by mixing the high-temperature water, which has been heated by hot-water-supply heat exchanger 150, and the low-temperature water, which has passed through bypass pipe 116. By adjusting the degree of opening of bypass flow regulating valve 120, outgoing-hot-water temperature To can be controlled into the target value of the hot-water temperature.

In the operation ON state of space-heating water heater 100b, when the hot water tap (not shown) is turned on while heating operation signal Sst is "0", and the flow rate Q1 detected by flow rate sensor 125 exceeds the minimum flow rate, then the hot water supply operation alone is executed. In the hot water supply operation, circulation pump 170 and combustion burner 102 are actuated. Further, distributing valve 160 is controlled so that the whole quantity of heating medium heated by heat exchanger 104 flows through the bypass path. The target value of the output temperature of heating medium in the hot water supply operation is preferably set to a value different from that of the heating operation and the simultaneous operation. In the hot water supply operation, outgoing-hot-water temperature To is controlled into the target value of the hot-water temperature by adjusting the degree of opening of bypass flow regulating valve 120.

On the other hand, space-heating water heater 100b in the operation OFF state maintains combustion burner 102 in the stopped state, even when heating operation signal Sst is "1", or even when the flow rate Q1 detected by flow rate sensor 125 exceeds the minimum flow rate. That is, none of the heating operation, the hot water supply operation, and the simultaneous operation is started since the heating medium is not heated. If space-heating water heater 100b is configured to supply the heating medium to a plurality of space heaters 180, the above-described execution and stop of the heating operation can be controlled by setting heating operation signal Sst to "1" while at least one of the plurality of space heaters 180 is in operation, and setting heating operation signal Sst to "0" while all the space heaters 180 are stopped.

The hot-water set temperature in the hot water supply operation and the simultaneous operation of space-heating water heater 100b can be changed by remote operation similar to that of embodiment 1. That is, when the hot-water set temperature after the change through remote operation is within the high-temperature region, password input is requested from the user. Also, the change in hot-water set temperature is valid only when the input password matches with the registered password.

On the other hand, in embodiment 2 in which space-heating water heater 100b having a space-heating function is remotely operated, the control process related to input for change in operation ON/OFF is different from the case of water heater 100a having only a hot-water supply function.

Further, in embodiment 2, a change in heating capacity of space-heating water heater 100b is also added as an object of remote operation. For example, the input screen shown in FIG. 6 may additionally include an indication pointer or the like for setting the heating capacity in a stepwise manner.

Figure 10:
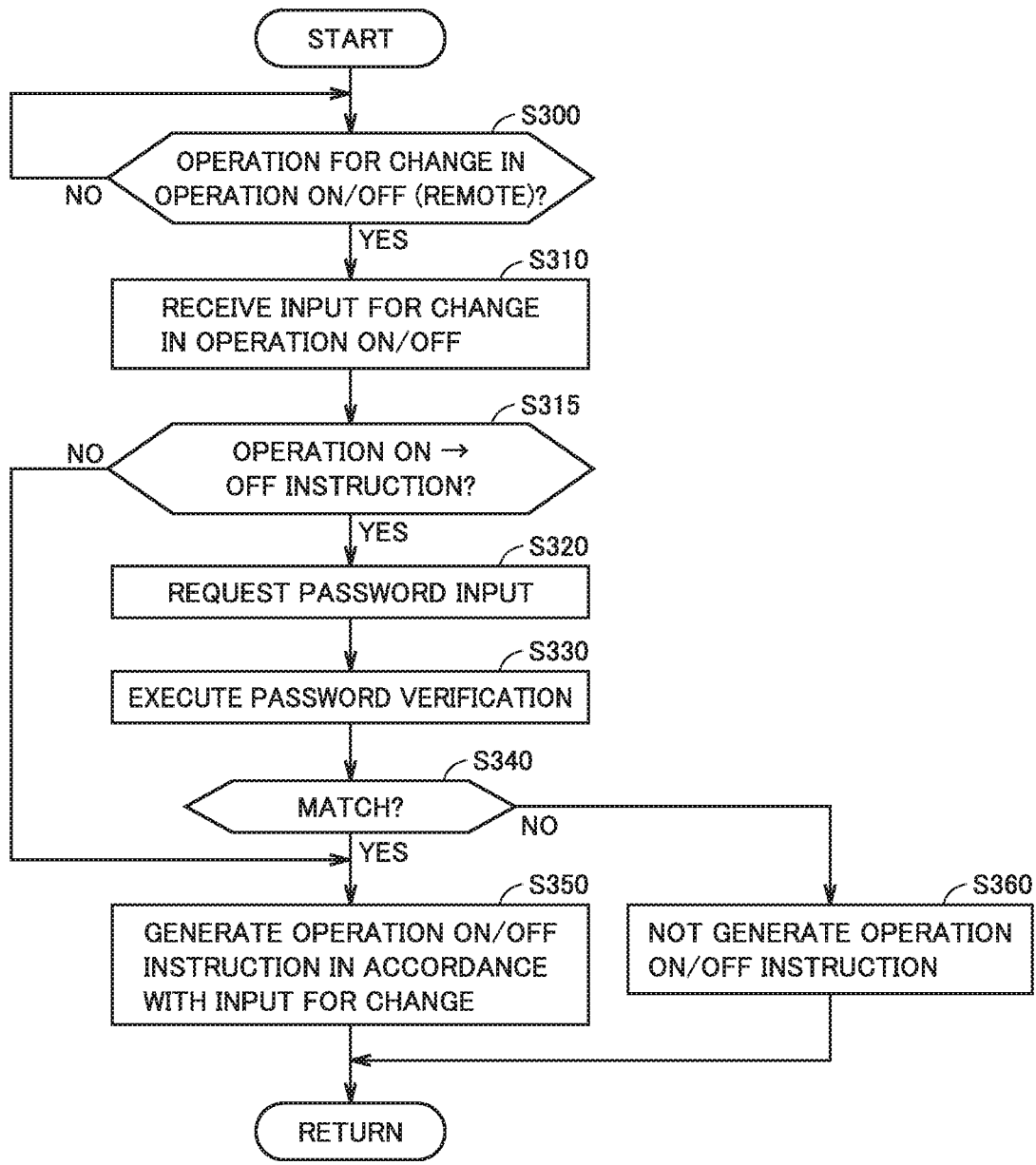
FIG. 10 is a flowchart explaining a first example of a control process related to a change in operation ON/OFF in remote operation of a hot water supply device according to embodiment 2.

FIG. 10 is a flowchart explaining, a control process related to input for change in operation ON/OFF in remote operation of a hot water supply device according to embodiment 2.

With reference to FIG. 10, by step S300, CPU 31 determines whether or not operation for change in operation ON/OFF of space-heating water heater 100b (i.e., remote operation) has been input to the input screen for remote operation. As described above, when the input screen for remote operation senses the user's touch on the operation pointer or softswitch on touch screen 32 related to the operation ON/OFF instruction, then step S300 is determined to be YES, and the processes at and after step S310 are started up. On the other hand, when the user's touch is not sensed, the start-up of the processes at and after step S310 is waited.

When CPU 31 senses input through remote operation for change in operation ON/OFF of space-heating water heater 100b (YES at S300), CPU 31 receives the input for change in operation ON/OFF by step S310 and advances the process to step S315.

At step S315, CPU 31 determines whether or not the received input for change in operation ON/OFF indicates a switch from the operation ON state to the operation OFF state. When the input for change is received by step S310, step S315 is determined to be YES if space-heating water heater 100b is in the operation ON state, whereas step S315 is determined to be NO if space-heating water heater 100b is in the operation OFF state.

When input for change that instructs a switch from the operation ON state to the operation OFF state is received (YES at S315), CPU 31 executes steps S320 to S340 identical to steps. S130 to S150 in FIG. 5.

Thus, step S320 requests password input from the user, and step S330 verifies the input password from the user against the registered password. Further, step S340 branches the process to steps S350 and S360 in accordance with the password verification result.

When the input password matches with the registered password (YES at S340), CPU 31 advances the process to step S350 and generates an operation ON/OFF instruction for space-heating water heater 100b in accordance with the input for change received at step S310. This operation ON/OFF instruction is input to controller 130 (FIG. 2) of space-heating water heater 100b via communication adapter 40. Thus, controller 130 switches space-heating water heater 100b from the operation ON state to the operation OFF state.

On the other hand, when the input password does not match with the registered password (NO at S340). CPU 31 advances the process to step S360, where no operation ON/OFF instruction is generated. As a result, an operation ON/OFF instruction is not input to controller 130 of space-heating water heater 100b, and thus the hot water supply on-state of space-heating water heater 100b is maintained. At step S360, touch screen 32 of smartphone 30 preferably shows a message notifying that the input for change in operation ON/OFF of space-heating water heater 100b has been invalidated because the password does not match.

Further, when input for change that instructs a switch from the operation OFF state to the operation ON state is received, CPU 31 determines step S315 to be NO and advances the process to step S350. Thus, an operation ON/OFF instruction for space-heating water heater 100b is generated in accordance with the input for change through remote operation and is input to space-heating water heater 100b via communication adapter 40. In this way, space-heating water heater 100b is switched from the operation OFF state to the operation ON state by remote operation that does not require password input.

According to the control process shown in FIG. 10, in remote operation directed to space-heating water heater 100b having a space-heating function, one-touch operation cannot make a switch from the operation ON state to the operation OFF state which involves stop of heating. Rather, password input is requested from the user before such a switch is permitted. This can prevent stop of heating due to an operational error or inadvertent operation (e.g., incorrect touching). This can enhance comfort of an in-home user, particularly in a cold season.

As to warning message 270 in FIG. 7, step S320 can notify, on an input screen which prompts the user to input a password, a possible influence on an in-home user which may be caused by the stop of heating.

As a variation of the control process related to input for change in operation ON/OFF, password input can also be requested for a switch from the operation OFF state to the operation ON state.

Figure 11:
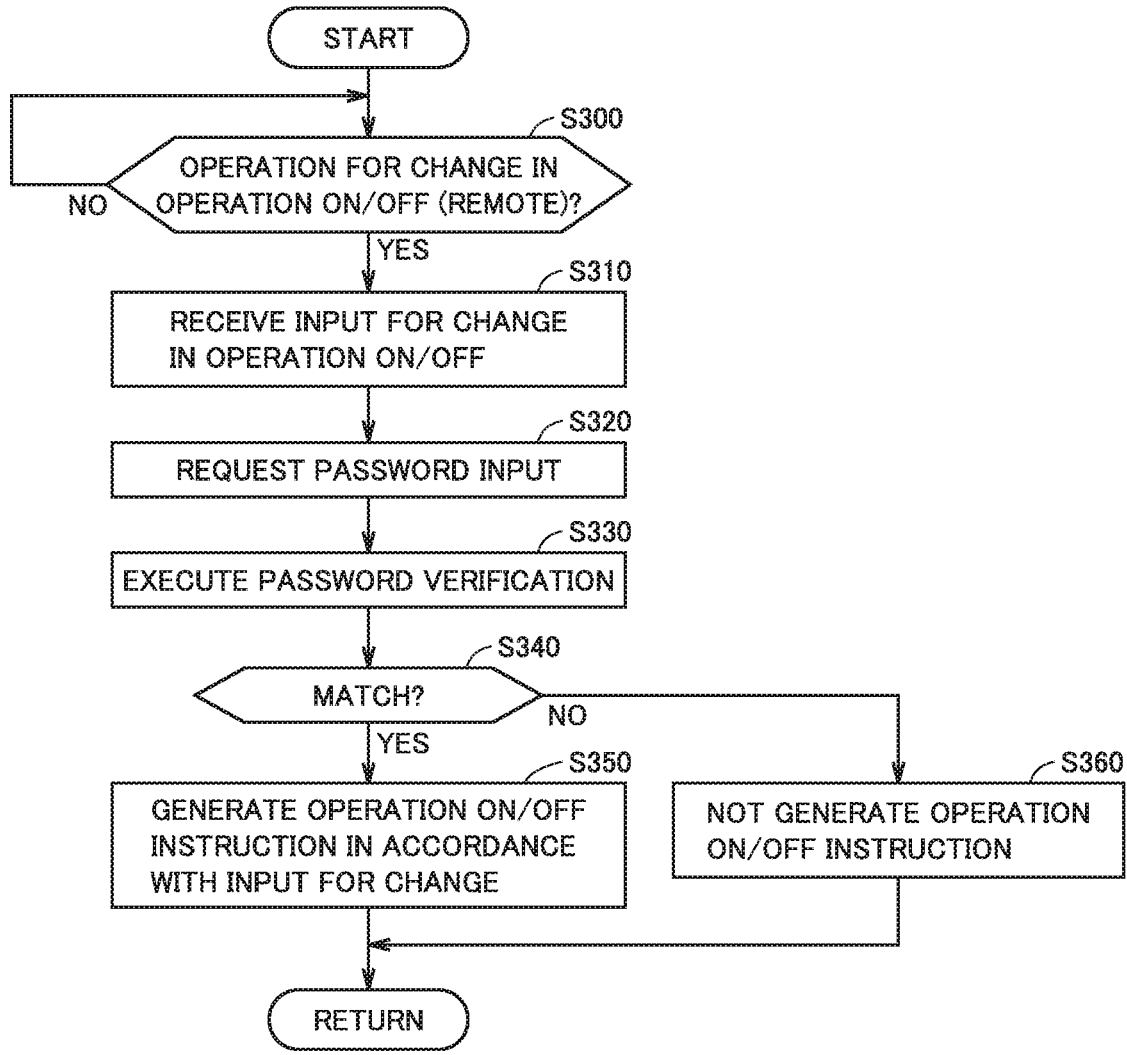
FIG. 11 is a flowchart explaining a second example of a control process related to a change in operation ON/OFF in remote operation of a hot water supply device according to embodiment 2.

FIG. 11 is a flowchart explaining a second example of a control process related to input for change in operation ON/OFF in remote operation of a hot water supply device according to embodiment 2.

When FIG. 11 is compared with FIG. 10, CPU 31 can omit the process of step S315 in. FIG. 10. Specifically, when CPU 31 receives input for change in operation ON/OFF by step S310, CPU 31 advances the process to steps S320 to S340.

As a result, password input is requested from the user before permission is given, for both a switch from the operation ON state to the operation OFF state, and a switch from the operation OFF state to the operation ON state. This can more reliably prevent start-up of undesired operation, such as heating operation, due to an operational error (e.g., incorrect touching).

Figure 12:
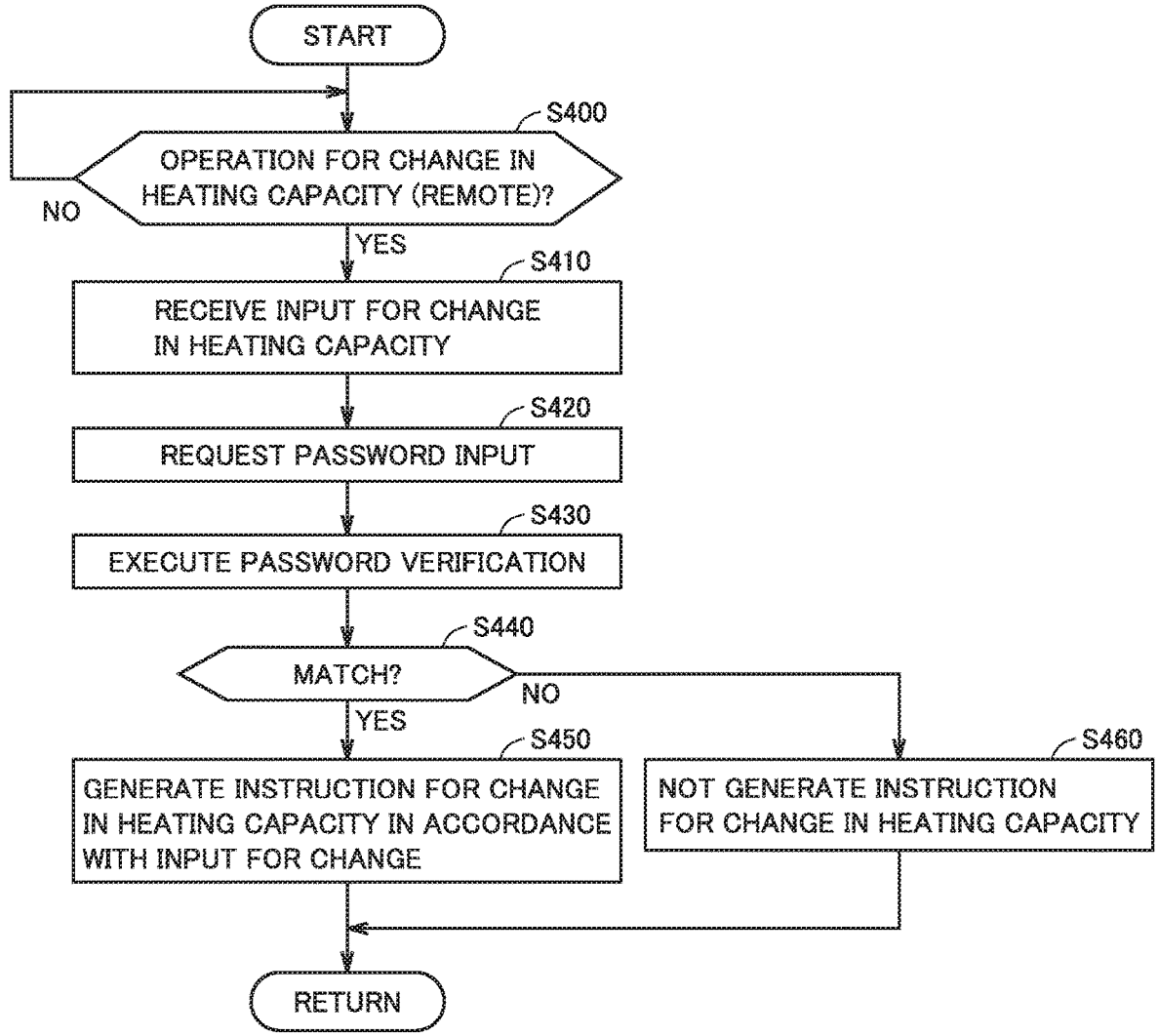
FIG. 12 is a flowchart explaining a control process related to a change in heating capacity in remote operation of a hot water supply device according to embodiment 2.

FIG. 12 is a flowchart explaining a control process related to input for change in heating capacity in remote operation of a hot water supply device according to embodiment 2.

With reference to FIG. 12, by step S400, CPU 31 determines whether or not operation for change in heating capacity of space-heating water heater 100b remote operation) has been input to the input screen for remote operation. As described above, when the input screen for remote operation senses the user's touch on the operation pointer or softswitch on touch screen 32 related to the setting of the heating capacity, then step S400 is determined to be YES, and the processes at and after step S410 are started up. On the other hand, when the user's touch is not sensed, the start-up of the processes at and after step S410 is waited.

When CPU 31 senses input through remote operation fir change in heating capacity of space-heating water heater 100*b* (YES at S400), CPU 31 receives the input for change in heating capacity by step S410 and advances the process to steps S420 to S440 identical to steps S320 to 5340. Thus, password input is requested from the user (S420), the input password from the user is verified against the registered password (S430), and the process branches in accordance with the verification result (S440).

When the input password matches with the registered password (YES at S440), CPU 31 advances the process to step S450 and generates an instruction for change in heating capacity in accordance with the input for change received at step S410. This instruction for change in heating capacity is input to controller 130 (FIG. 2) of space-heating water heater 100*b* via communication adapter 40. Thus, controller 130 changes the target value of the output temperature of heating medium from heat exchanger 104 in accordance with the heating capacity after the change.

On the other hand, when the input password does not match with the registered password (NO at S440), CPU 31 advances the process to step S460, where no instruction for change in heating capacity is generated. As a result, an instruction for change in heating capacity is not input to controller 130 of space-heating water heater 100*b*, and thus the heating capacity of space-heating water heater 100*b*, i.e., the target value of the output temperature of heating medium, is maintained at the current setting. At step S460, touch screen 32 of smartphone 30 preferably shows a message notifying that the input for change in heating capacity of space-heating water heater 100*b* has been invalidated because the password does not match.

Thus, the system for remote operation of a hot water supply device according to embodiment 2 can prevent a change in operation ON/OFF or heating capacity due to an operational error or inadvertent operation (e.g., incorrect touching), in remote operation of space-heating water heater 100*b* having both a space-heating function and a hot-water supply function. Thus, reduction in comfort of the user can be prevented.

Figure 13:
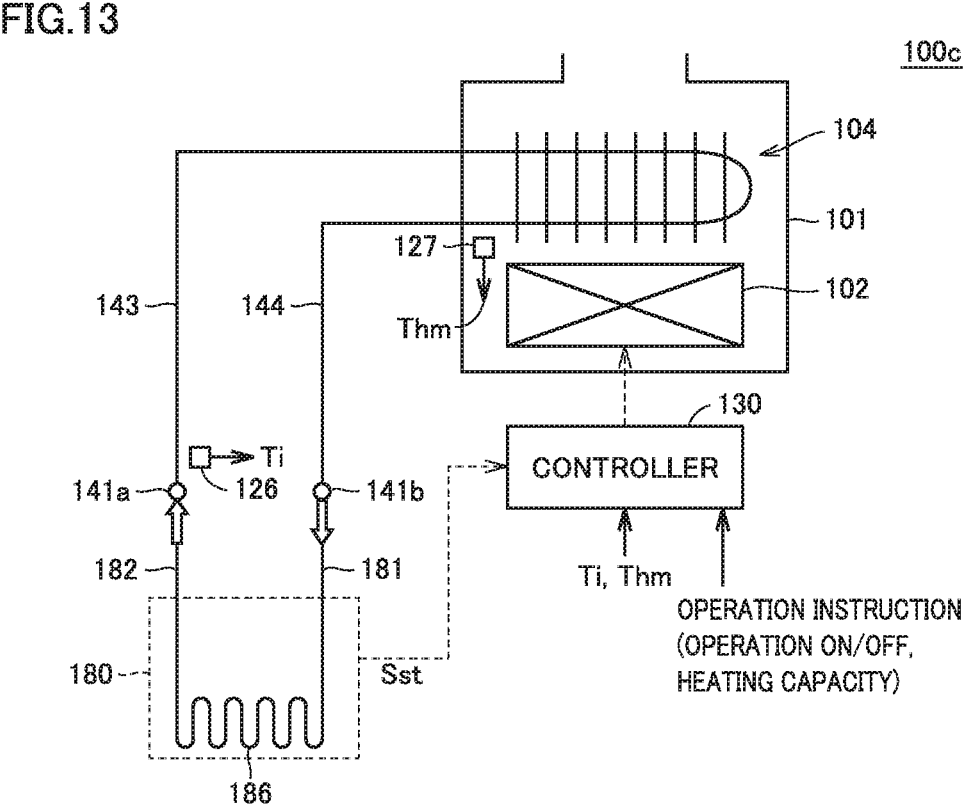
FIG. 13 is a block diagram showing a variation of an object of operation in a system for remote operation of a hot water supply device according to embodiment 2.

In the system for remote operation of a hot water supply device according to embodiment 2, a heating-only water heater 100*c* having only a space-heating function shown in FIG. 13 may be an object of operation.

FIG. 13 is a block diagram showing a configuration of heating-only water heater 100*c*, which is a variation of an object of operation in a system for remote operation of a hot water supply device according to embodiment 2.

With reference to FIG. 13, in the system for remote control according to embodiment 2, heating-only water heater 100*c* may be connected in hot water supply system 10, instead of water heater 100*a* in the configuration in FIG. 1.

When FIG. 13 is compared with FIG. 9, heating-only water heater 100*c* includes a feature related to the space-heating function, among the features of space-heating water heater 100*b*. That is, heating-only water heater 100*c* includes only a feature (heating circulation path) for circulating the heating medium between water heater 100*c* and space heater 180.

Specifically, heating-only water heater 100*c* does not include hot-water-supply heat exchanger 150, distributing valve 160, pipes 145 to 147, incoming water pipe 112, outgoing hot water pipe 115, bypass pipe 116, and bypass flow regulating valve 120 of space-heating water heater 100*b* shown in FIG. 9. That is, in heating-only water heater 100*c*, when circulation pump 170 is actuated, a heating circulation path can be formed by pipe 143, heat exchanger 104, and pipe 144, between input end 141*a* and output end 141*b*.

Controller 130 receives input of input temperature Ti and output temperature Thm of heating medium detected by temperature sensors 126 and 127, and an operation instruction related to the space-heating function. The operation instruction includes an operation ON/OFF instruction for switching between the operation ON state and the operation OFF state of heating-only water heater 100*c*, and a heating capacity of the heating operation which is set in a stepwise manner. Further, controller 130 receives input of heating operation signal Sst from space heater 180 which is set in a manner similar to FIG. 9.

In the operation ON state of heating-only water heater 100*c*, when heating operation signal Sst is set to "1", controller 130 actuates circulation pump 170 and combustion burner 102. This allows the heating medium, which has been heated, to flow through the heating circulation path. Thus, the heating operation is executed. In the heating operation, the quantity of heat generation from combustion burner 102 is controlled so that output temperature Thm of heating medium will be equal to the output temperature target corresponding to the set heating capacity.

On the other hand, even in the operation ON state, heating-only water heater 100*c* maintains circulation pump 170 and combustion burner 102 in the stopped state when heating operation signal Sst is set to "0". Also, in the operation OFF state, heating-only water heater 100*c* maintains circulation pump 170 and combustion burner 102 in the stopped state, even when heating operation signal Sst is set to "1". That is, the heating operation is not started since the heating medium is not heated.

The operation ON/OFF and the heating capacity of heating-only water heater 100*c* can be changed by remote operation similar to that of embodiment 2, in accordance with the control processes shown in FIG. 10 to FIG. 12. That is, the remote operation can be applied so that password input is requested from the user for a change at least from the operation ON state to the operation OFF state, and for a change in heating capacity.

In the system for remote operation of a hot water supply device according to embodiment 2, the process of step S310 implements the function of the "(second) receiving processing unit", and the processes of step S315 (when determined to be YES) and 5320 in FIG. 10, or the process of step S320 in FIG. 11 implement the function of the "(second) password request processing unit". The processes of step S340 (when determined to be YES) and S350 implement the function of the "first operation state control unit", and the processes of step S340 (when determined to be NO) and S360 implement the function of the "second operation state control unit". The process of step S410 implements the function of the "(third) receiving processing unit", and the process of step S420 implements the function of the "(third) password request processing unit". The processes of step S440 (when determined to be YES) and S450 implement the function of the "first heating capacity control unit", and the processes of step S440 (when determined to be NO) and S460 implement the function of the "second heating capacity control unit".

Embodiment 3

Embodiments 1 and 2 describe the control processes for requesting password input in remote operation, so as to prevent reduction in comfort of the user. However, there may also be a case in which, at the time of installation of a hot water supply device, a worker performs remote operation multiple times in a short time for, for example, changing the hot-water set temperature for adjustment. In such a case, requesting password input repeatedly for each remote operation may deteriorate workability.

Accordingly, embodiment 3 describes a control process for providing a password omission period during which password input is not necessary once password verification is completed.

Figure 14:
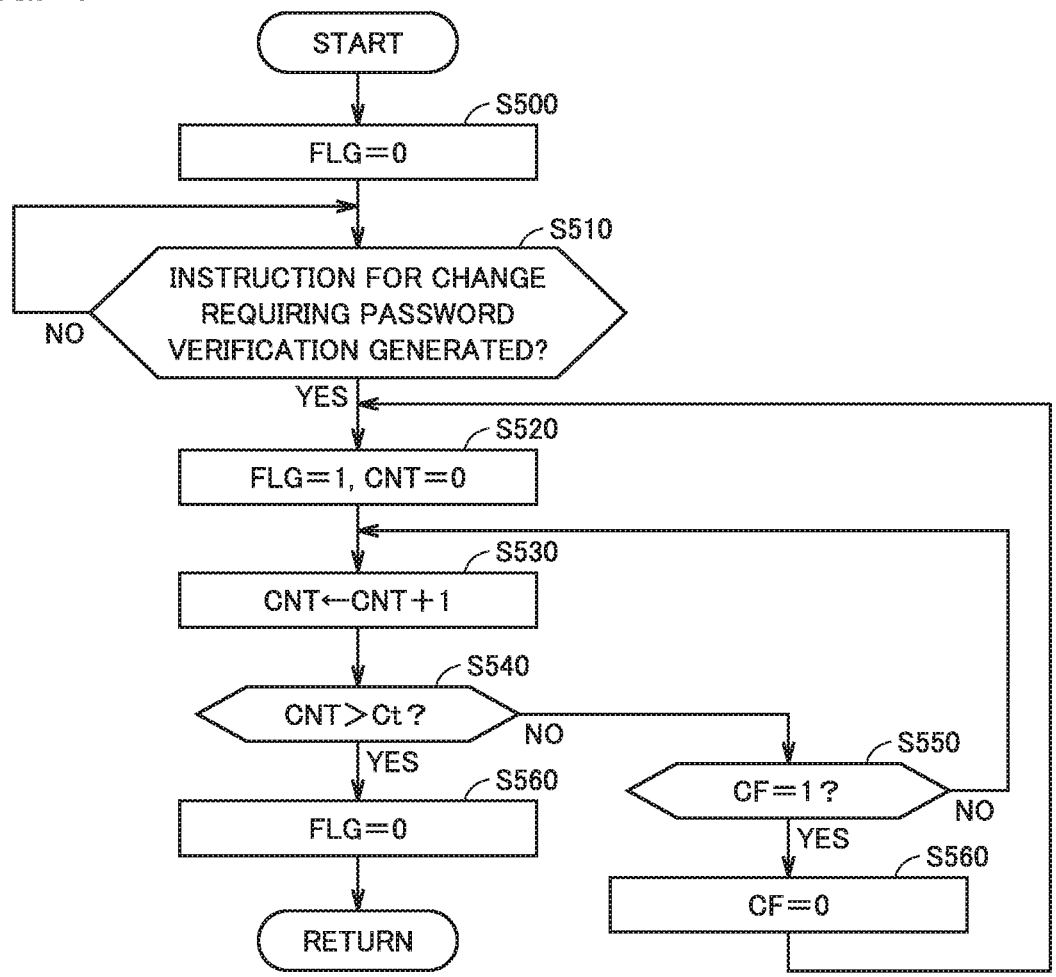
FIG. 14 is a flowchart explaining a control process for providing a period not requiring password input in remote operation according to embodiment 3.

FIG. 14 is a flowchart explaining a control process for providing a password omission period in remote operation according to embodiment 3.

With reference to FIG. 14, embodiment 3 introduces a flag FLG representing whether or not the period is the password omission period, a count value CNT for measuring the elapsed time since the start of the password omission period, and a control flag CF for controlling clearing of count value CNT. Flag FLG is set to "1" in the password omission period, and is set to "0" in the other periods.

The control process shown in FIG. 14 can be started up when a predetermined input screen for remote operation appears after dedicated application software for remote operation is started up and logged in, as in FIG. 5.

By step S500, CPU 31 initializes the value of flag FLG to "0" (FLG=0). When CPU 31 generates an instruction for change to hot water supply device 100 with password verification, CPU 31 determines step S510 to be YES and advances to the processes at and after step S520. Hot water supply device 100 is a collective representation of water heater 100a, space-heating water heater 100b, and heating-only water heater 100c. For example, step S510 is determined to be YES when step S150 (FIG. 5), step S340 (FIG. 10, FIG. 11), or step S440 (FIG. 12) is determined to be YES; whereas step S510 is determined to be NO at the other timings.

Accordingly, until an instruction for change to hot water supply device 100 is generated with password verification, step S510 is determined to be NO, and thus start-up of the processes at and after step S520 is waited.

When CPU 31 generates an instruction for change to hot water supply device 100 with password verification (YES at S510), CPU 31 changes flag FLG from "0" to "1" and initializes count value CNT (CNT=0) by step S520.

Further, CPU 31 counts up count value CNT at regular time intervals by step S530, and determines whether or not count value CNT has exceeded a determination value Ct at step S540. Determination value Ct may be set in accordance with count value CNT corresponding to a set time length of the password omission period (e.g., 10 to 15 minutes).

When count value CNT exceeds determination value Ct (YES at S540), CPU 31 changes flag FLG from "1" to "0" by step S560.

The control process for remote operation described in embodiment 1 is modified with the introduction of flag FLG.

Figure 15:
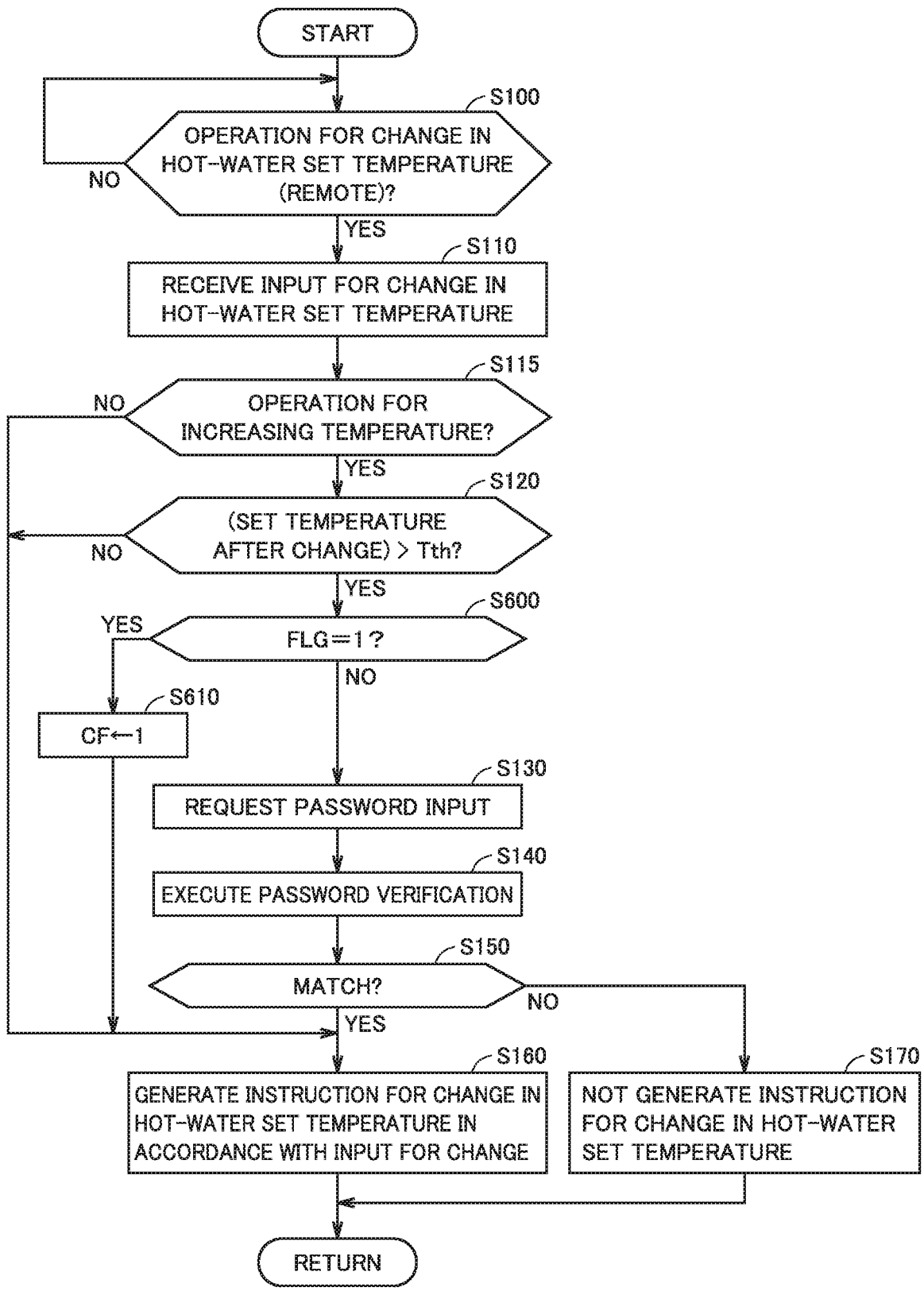
FIG. 15 is a flowchart explaining a control process related to input for change in hot-water set temperature in remote operation according to embodiment 3.

FIG. 15 shows a flowchart explaining a control process related to input for change in hot-water set temperature in remote operation according to embodiment 3. The control process shown in FIG. 15 is obtained by combining the control process shown in FIG. 5 with the setting of the password omission period.

When FIG. 15 is compared with FIG. 5, CPU 31 further executes steps S600, S610 in addition to steps S100 to S170 identical to those in FIG. 5.

When step S120 is determined to be YES, that is, when CPU 31 receives input for change where the hot-water set temperature after the change is within the high-temperature region (which requires password input), CPU 31 checks the current value of flag FLG by step S600.

When flag FLG=0 is satisfied (NO at S600), CPU 31 executes the processes of steps S130 to S170 identical to those in FIG. 5. Specifically, CPU 31 requests password input from the user, and validates the change in hot-water set temperature on condition that the input password matches with the registered password.

On the other hand, when flag FLG=1 is satisfied (YES at S600), CPU 31 sets control flag CF to "1" by step S610 and advances the process to step S160. As a result, during a period of flag FLG=1, CPU 31 generates an instruction for change in hot-water set temperature without requiring password verification, even if CPU 31 receives input for change where the hot-water set temperature after the change is within the high-temperature region.

That is, during the password omission period with flag FLG=1, the hot-water set temperature value can be changed by remote operation to any temperature region, without requesting password input from the user. When an instruction for change is generated in response to input for change that does not inherently require password input (when step S115 or S120 is determined to be NO), control flag CF is maintained at "0". However, when an instruction for change is generated without password verification in response to input for change that inherently requires password input (when steps S120 and S600 are determined to be YES), control flag CF is changed, to "1".

Referring back to FIG. 14, in the period until count value CNT exceeds determination value Ct (NO at S540), CPU 31 checks the current value of control flag CF by step S550.

When CF=0 is satisfied (NO at S550), CPU 31 returns the process to step S530 to count up count value CNT at regular time intervals, and advances the process to step S540 to compare count value CNT after the count-up with determination value Ct.

On the other hand, when CF=1 is satisfied (YES at S550), CPU 31 returns control flag CF to "0" by step S560, and then returns the process to step S520. Thus, FLG=1 is maintained, while count value CNT is initialized (CNT=0). Further, count value CNT is counted up at regular time intervals again (S530), and is compared with determination value Ct (S540).

Thus, when an instruction for change in hot-water set temperature is generated through password verification in response to input for change in hot-water set temperature that requires password input, then FLG=1 is maintained until count value CNT exceeds determination value Ct, thus providing a password omission period. Further, using control flag CF to initialize count value CNT can prolong the time length of the password omission period each time an instruction for change that requires password input is generated before the password omission period expires.

In the control processes in FIG. 14 and FIG. 15, the password omission period can be provided without using control flag CF. In this case, in FIG. 14, the processes of steps S550, S560 are not performed. That is, when step S540 is determined to be NO, the process is directly returned to step S530. Further, in FIG. 15, the process of step S610 is not performed. In this case, when the time length corresponding to determination value Ct has elapsed since the password verification, the password omission period expires without variation. That is, the time length of password omission period is a fixed time length corresponding to determination value Ct.

Thus, according to embodiment 3, in remote operation directed to hot water supply device 100 (water heater 100a and space-heating water heater 100b) having a hot-water supply function, when input for change for increasing the hot-water set temperature to the high-temperature region is received, password input is requested from the user before the change in hot-water set, temperature is validated. However, once the verification of password has completed, the password omission period is provided, thus eliminating excessive request for password input. This can enhance the efficiency of the adjustment work.

Embodiment 3, where a period not requiring password input is set, can also be applied to the remote operation described in embodiment 2 intended for hot water supply device 100 (space-heating water heater 100b and heating-only water heater 100c) having a space-heating function.

Figure 16:
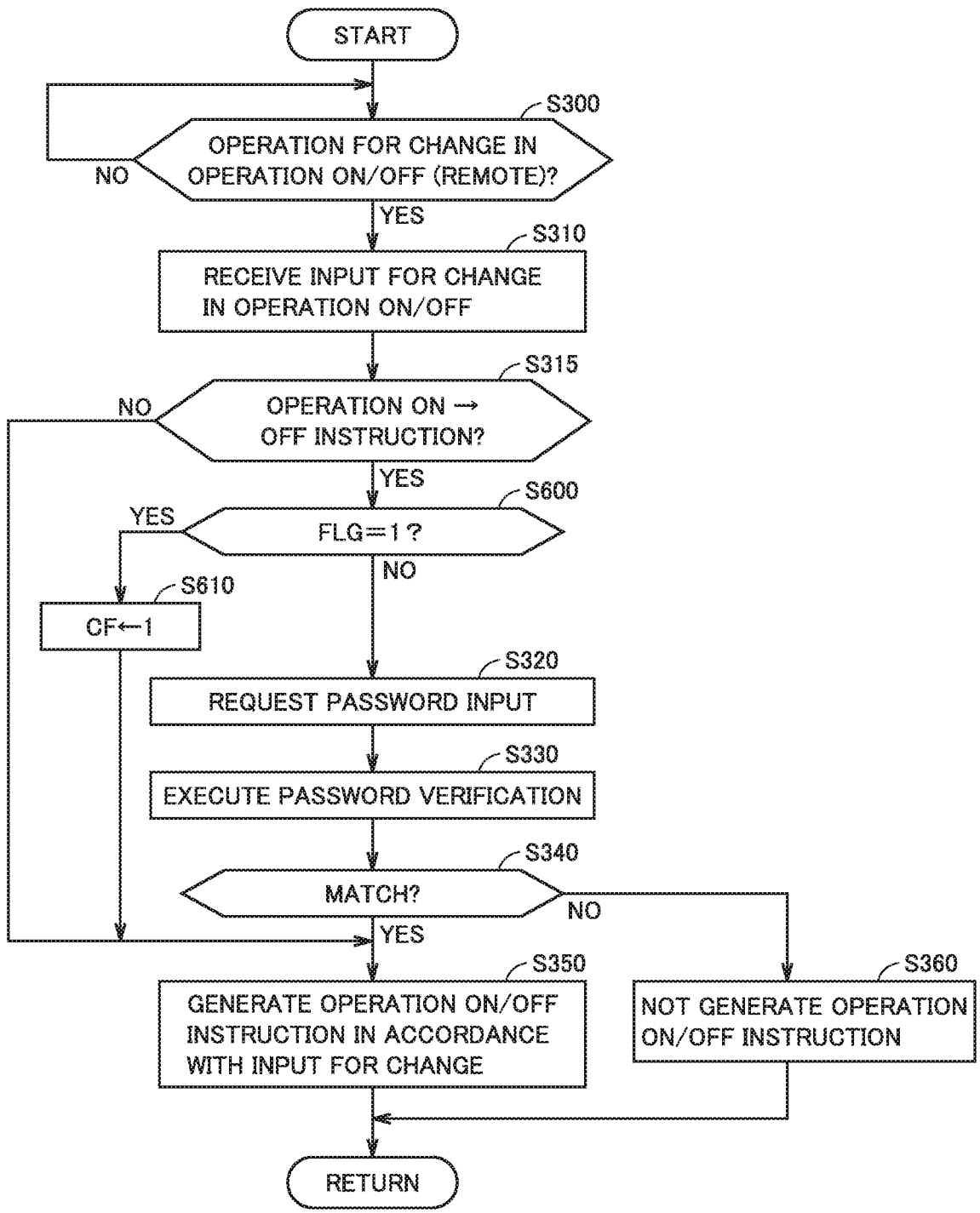
FIG. 16 is a flowchart explaining a first example of a control process related to a change in operation ON/OFF in remote operation of a hot water supply device according to embodiment 3.
Figure 17:
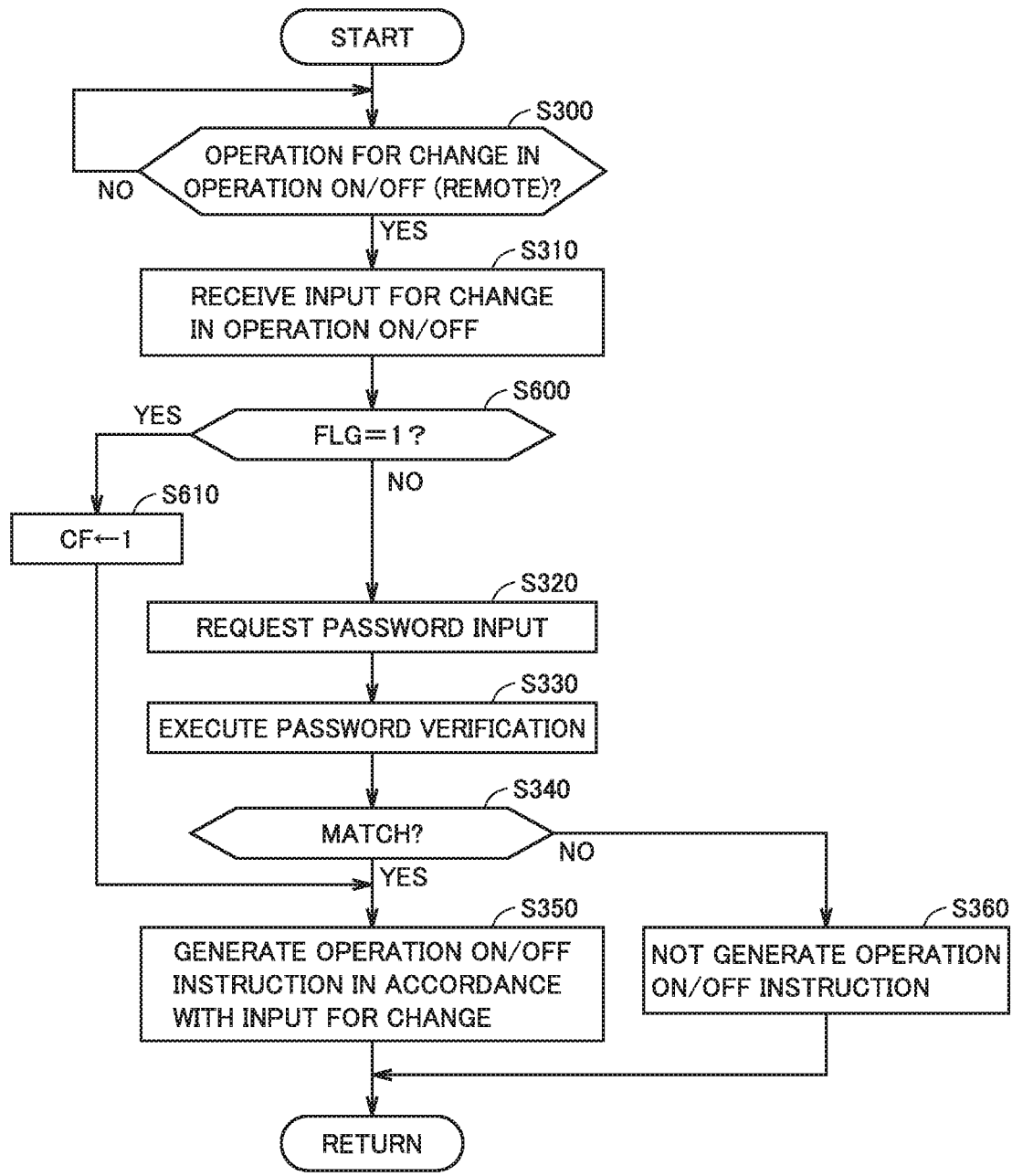
FIG. 17 is a flowchart explaining a second example of a control process related to a change in operation ON/OFF in remote operation of a hot water supply device according to embodiment 3.

FIG. 16 and FIG. 17 show flowcharts explaining control processes related to input for change in operation ON/OFF of a hot water supply device having a space-heating function in remote operation according to embodiment 3. The control processes shown in FIG. 16 and FIG. 17 are obtained by combining the control processes shown in FIG. 10 and FIG. 11 with the setting of the password omission period.

When FIG. 16 is compared with FIG. 10, CPU 31 further executes steps S600, S610 identical to those in FIG. 15, in addition to steps S300 to S360 identical to those in FIG. 10.

When step S315 is determined to be YES, that is, when CPU 31 receives input for change that instructs a switch from the operation ON state to the operation OFF state (which requires password input), CPU 31 checks the current value of flag FLG by step S600. When flag FLG=0 is satisfied (NO at S600), CPU 31 executes the processes of steps S320 to S360 identical to those in FIG. 10. Specifically, CPU 31 requests password input from the user, and validates the change in operation ON/OFF on condition that the input password matches with the registered password.

On the other hand, when flag FLG=1 is satisfied, CPU 31 sets control flag CF to "1" by step S610 identical to that in FIG. 15, and advances the process to step S350. Thus, CPU 31 generates an instruction for change in operation ON/OFF without requiring password verification even if CPU 31 receives input for change that instructs a switch from the operation ON state to the operation OFF state.

Thus, as with the change in hot-water set temperature (FIG. 15), the control processes in FIG. 14 and FIG. 16 can also set a period not requiring password input, corresponding to the period of FLG=1, in remote operation where password input is required for the input for change that instructs a switch from the operation ON state to the operation OFF state.

When FIG. 17 is compared with FIG. 11, CPU 31 further executes steps S600, S610 identical to those in FIG. 15, in addition to steps S300 to S360 identical to those in FIG. 11 for requesting password input for both a switch from the operation ON state to the operation OFF state, and a switch from the operation OFF state to the operation ON state.

When step S300 is determined to be YES and CPU 31 receives input for change in operation ON/OFF (S310), then CPU 31 executes step S600. When flag FLG=0 is satisfied (NO at S600), CPU 31 executes the processes of steps S320 to S360 identical to those in FIG. 11. Specifically, CPU 31 requests password input from the user, and validates the change in operation ON/OFF on condition that the input password matches with the registered password.

On the other hand, when flag FLG=1 is satisfied, CPU 31 executes step S610 identical to that in FIG. 15, and generates an operation ON/OFF instruction by step S350 without requiring password verification.

Thus, the control processes in FIG. 14 and FIG. 17 can also set a period not requiring password input, corresponding to the period of FLG=1, in remote operation directed to a hot water supply device having a space-heating function, where password input is required for the input for change that instructs a switch between the operation ON state and the operation OFF state.

Figure 18:
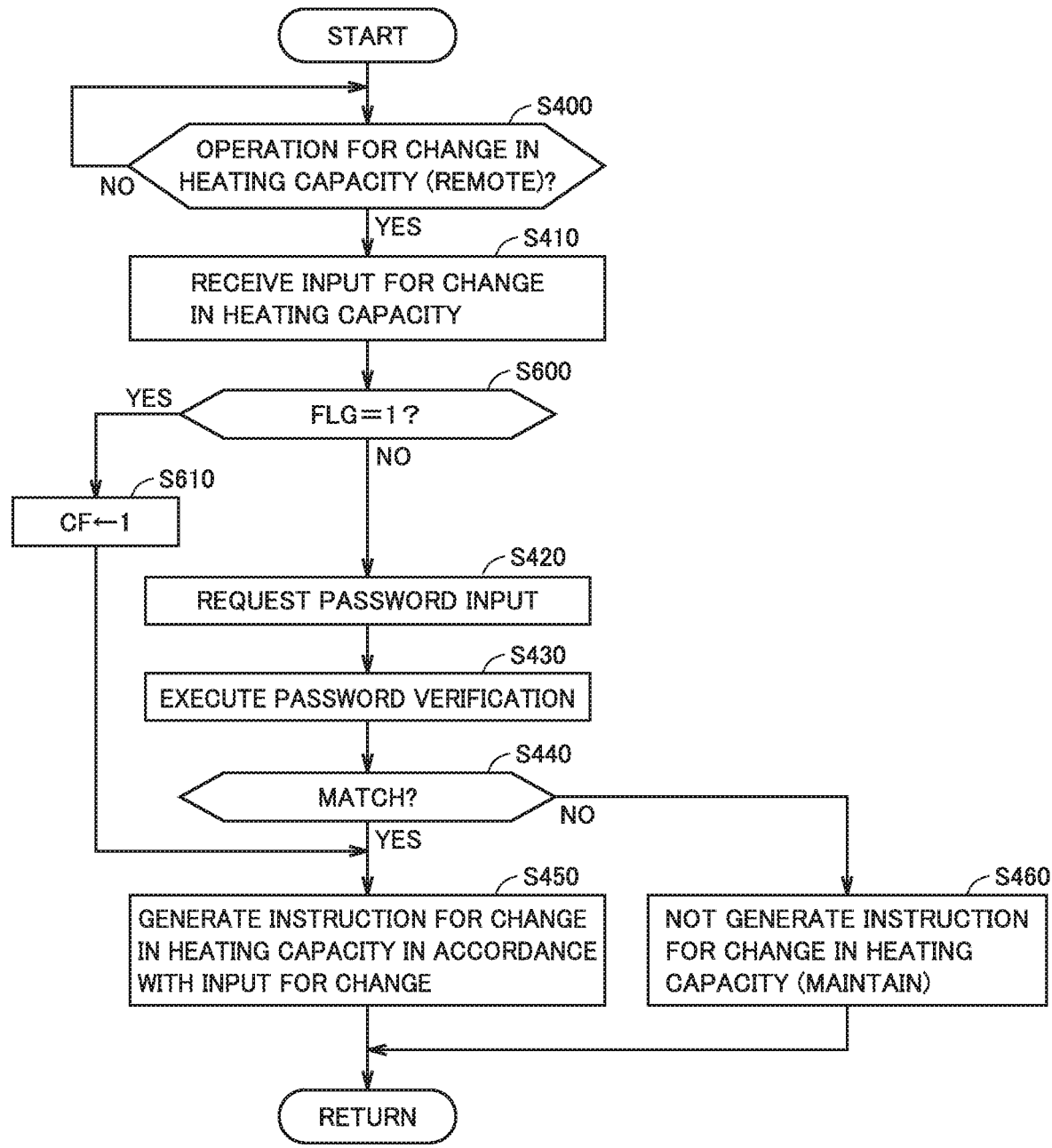
FIG. 18 is a flowchart explaining a control process related to a change in heating capacity in a system for remote operation of a hot water supply device according to embodiment 3.

FIG. 18 is a flowchart explaining a control process related to input for change in heating capacity of a hot water supply device having a space-heating function in remote operation according to embodiment 3. The control process shown in FIG. 18 is obtained by combining the control process shown in FIG. 12 with the setting of the period not requiring password input.

When FIG. 18 is compared with FIG. 12, CPU 31 further executes steps S600, S610 identical to those in FIG. 15, in addition to steps S400 to S460 identical to those in FIG. 12.

When CPU 31 receives input for change in heating capacity (S410), CPU 31 executes step S600. When flag FLG=0 is satisfied (NO at S600), CPU 31 executes the processes of steps S420 to S460 identical to those in FIG. 12. Specifically, CPU 31 requests password input from the user, and validates the change in heating capacity on condition that the input password matches with the registered password.

On the other hand, when flag FLG=1 is satisfied, CPU 31 executes step S610 identical to that in FIG. 15, and generates an instruction for change in heating capacity by step S450 without requiring password verification.

Thus, the control processes in FIG. 14 and FIG. 18 can also set a password omission period, corresponding to the period of FLG=1, in remote operation directed to a hot water supply device having a space-heating function, where password input is required for the input for change in heating capacity. In the setting of the password omission period described in FIG. 16 to FIG. 18, the time length of the password omission period can be fixed without using control flag CF.

Thus, according to the remote operation in embodiment 3, in remote operation directed to hot water supply device 100 (space-heating water heater 100b and heating-only water heater 100c) having a space-heating function, password input is requested from the user for a change at least from the operation ON state to the operation OFF state, and for a change in heating capacity. However, once the verification of password has completed, the password omission period is provided, thus eliminating excessive request for password input. This can enhance the efficiency of the adjustment work.

In the system for remote operation of a hot water supply device according to embodiment 3, the process of step S600 can implement the function of the "password omission processing unit", and the processes of steps S610 and S520 can implement the function of the "count initializing unit".

Although embodiments 1 to 3 describe an example in which smartphone 30 is used as an "operation terminal" for remote operation using communication connection via a communication network, tablet terminal 80, terminal 71 of support center 70, or a personal computer (not shown) may be used as the "operation terminal". In this case, a CPU built in tablet terminal 80, terminal 71 (support center 70), or a personal computer may be used, instead of CPU 31 of smartphone 30, to execute the process in each step in the flowcharts including FIG. 5.

Further, the control processes for remote operation shown in the flowcharts including FIG. 5 may be executed not only by a CPU (computer) alone of the "operation terminal" represented by CPU 31 of smartphone 30, but also by the cooperation of the CPU of the "operation terminal" and CPU 25 (computer) of server device 21 (application server 21b). In this case, the process in each step in the flowcharts may be executed by the CPU of the "operation terminal" or by the CPU of server device 21 (e.g., application server 21b) in accordance with the shares programmed in advance. Alternatively, the CPU of the "operation terminal" and the CPU of server device 21 can be programmed so that the process of each step is executed by their cooperation.

It should be understood that the embodiments disclosed herein are, illustrative and non-restrictive in every respect. The scope of the present invention is defined not by the above description but by the terms of the claims, and is intended to include any modification within the scope and meaning equivalent to the terms of the claims.

REFERENCE SIGNS LIST

10: hot water supply system; 20: management center; 21: server device; 21a: cloud server; 21b: application server; 26: communication unit; 27, 34: memory; 27a: ROM; 27b: RAM; 30: smartphone; 32: touch screen; 33a: display; 36: communication interface; 37: speaker; 38: memory I/F; 39: memory card; 40: communication adapter; 50: duplex communication line; 60: router; 70: support center; 71: terminal; 80: tablet terminal; 100: hot water supply device; 100a: water heater; 100b: space-heating water heater; 100c: heating-only water heater; 102: combustion burner; 104: heat exchanger; 105: remote controller; 112: incoming water pipe; 115: outgoing hot water pipe; 116:bypass pipe 117: junction; 120:bypass flow regulating valve; 121 to 123, 126, 127: temperature sensor; 125: flow rate sensor; 130: controller; 141a: input end (heating medium); 141b: output end (heating medium); 143 to 147: pipe; 150: hot-water-supply heat exchanger; 151: primary-side path; 152: secondary-side path; 160: distributing valve; 160a to 160c: node (distributing valve); 170: circulation pump; 180: space heater; 181: external pipe; 186: radiator; 200, 230: indicator bar; 205: boundary (high-temperature region); 210, 235 operation pointer; 220, 240: indicator icon; 250 softswitch; 260: password input section; 265: execution button; 270: warning message; CF: control flag; CNT: count value: FLG: flag (password omission period); Q1: detected flow rate; Th: high-temperature-water temperature Thm: output temperature (heating medium); Ti: input temperature (heating medium); To: outgoing-hot-water temperature; Tth: determination temperature (high-temperature region) Tw: low-temperature-water temperature

The invention claimed is:

1. A communication adapter for use in a system for remote operation of a hot water supply device using communication connection via a communication network,
the hot water supply device having a hot-water supply function,
the system for remote operation comprising:
a receiving processing unit to receive input for change in hot-water set temperature of the hot water supply device to an operation terminal connectable to the communication network;
a password request processing unit to generate a request for input of a password for the operation terminal when a hot-water set temperature after a change instructed by the input for change is within a predetermined high-temperature region;
a first temperature instruction control unit to generate an instruction for change in the hot-water set temperature to the hot water supply device when a password input to the operation terminal in response to the request for input matches with a predetermined registered password; and
a second temperature instruction control unit to generate no instruction for change in the hot-water set temperature to the hot water supply device when the input password does not match with the registered password,
the communication adapter being connected to the hot water supply device via a communication line, and being connectable to the communication network and the operation terminal, the communication adapter being configured to input the instruction for change generated by the first temperature instruction control unit to the hot water supply device.

2. The communication adapter according to claim 1, wherein
the system for remote operation further comprises a third temperature instruction control unit to, when a decrease in the hot-water set temperature is instructed by the input for change, generate an instruction for change in the hot-water set temperature to the hot water supply device, without requesting input of the password, regardless of the hot-water set temperature after the change, and
the communication adapter inputs the instruction for change generated by the third temperature instruction control unit to the hot water supply device.

3. The communication adapter according to claim 1, wherein
the system for remote operation further comprises a password omission processing unit to, when the password input to the operation terminal in response to the request for input generated by the password request processing unit matches with the registered password, generate an instruction for change in the hot-water set temperature to the hot water supply device, in accordance with the input for change in the hot-water set temperature of the hot water supply device to the operation terminal, without requesting input of the password until elapsed time since a point of time of matching reaches prescribed time, and
the communication adapter inputs the instruction for change generated by the password omission processing unit to the hot water supply device.

4. The communication adapter according to claim 3, wherein the system for remote operation further comprises a count initializing unit to clear a count of the elapsed time when the instruction to the hot water supply device is generated by the password omission processing unit before the elapsed time since the point of time of matching reaches the prescribed time.

5. The communication adapter according to claim 1, wherein the communication adapter is communicably connected, via the communication network, to the operation terminal and a management center storing the registered password.

6. A communication adapter for use in a system for remote operation of a hot water supply device using communication connection via a communication network,
the hot water supply device having a space-heating function to output high-temperature water to a space heater, the system for remote operation comprising:
- a receiving processing unit to receive input for change in operation ON/OFF of the space-heating function to an operation terminal connectable to the communication network;
- a password request processing unit to generate a request for input of a password for the operation terminal when turn-off of the space-heating function is instructed by the input for change to the receiving processing unit;
- a first operation state control unit to generate an OFF instruction for turning off the space-heating function to the hot water supply device when a password input to the operation terminal in response to the request for input generated by the password request processing unit matches with a predetermined registered password; and
- a second operation state control unit to generate no OFF instruction for turning off the space-heating function to the hot water supply device when the input password does not match with the registered password, the communication adapter being connected to the hot water supply device via a communication line, and being connectable to the communication network and the operation terminal, the communication adapter being configured to input the OFF instruction generated by the first operation state control unit to the hot water supply device.

7. The communication adapter according to claim 6, wherein
the system for remote operation further comprises a password omission processing unit to, when the password input to the operation terminal in response to the request for input generated by the password request processing unit matches with the registered password, generate an ON instruction or an OFF instruction for turning on or off the space-heating function, in accordance with the input for change in the operation ON/OFF of the space-heating function to the operation terminal, without requesting input of the password until elapsed time since a point of time of matching reaches prescribed time, and
the communication adapter inputs the ON instruction or the OFF instruction generated by the password omission processing unit to the hot water supply device.

8. The communication adapter according to claim 7, wherein the system for remote operation further comprises a count initializing unit to clear a count of the elapsed time when the instruction to the hot water supply device is generated by the password omission processing unit before the elapsed time since the point of time of matching reaches the prescribed time.

9. The communication adapter according to claim 6, wherein the communication adapter is communicably connected, via the communication network, to the operation terminal and a management center storing the registered password.

10. A communication adapter for use in a system for remote operation of a hot water supply device using communication connection via a communication network, the hot water supply device having a space-heating function to output high-temperature water to a space heater, the system for remote operation comprising:
- a receiving processing unit to receive input for change in heating capacity of the space-heating function to an operation terminal connectable to the communication network;
- a password request processing unit to generate a request for input of a password for the operation terminal when the input for change is received by the receiving processing unit;
- a first heating capacity control unit to generate an instruction for change in the heating capacity to the hot water supply device when a password input to the operation terminal in response to the request for input generated by the password request processing unit matches with a predetermined registered password; and
- a second heating capacity control unit to generate no instruction for change in the heating capacity to the hot water supply device when the input password does not match with the registered password, the communication adapter being connected to the hot water supply device via a communication line, and being connectable to the communication network and the operation terminal, the communication adapter being configured to input the instruction for change generated by the first heating capacity control unit to the hot water supply device.

11. The communication adapter according to claim 10, wherein
the system for remote operation further comprises a password omission processing unit to, when the password input to the operation terminal in response to the request for input generated by the password request processing unit matches with the registered password, generate an instruction for change in the heating capacity to the hot water supply device, in accordance with the instruction for change in the heating capacity to the operation terminal, without requesting input of the password until elapsed time since a point of time of matching reaches prescribed time, and
the communication adapter inputs the instruction for change generated by the password omission processing unit to the hot water supply device.

12. The communication adapter according to claim 11, wherein the system for remote operation further comprises a count initializing unit to clear a count of the elapsed time when the instruction to the hot water supply device is generated by the password omission processing unit before the elapsed time since the point of time of matching reaches the prescribed time.

13. The communication adapter according to claim 10, wherein the communication adapter is communicably connected, via the communication network, to the operation terminal and a management center storing the registered password.

* * * * *